US012470746B2

(12) United States Patent
Chen et al.

(10) Patent No.: US 12,470,746 B2
(45) Date of Patent: Nov. 11, 2025

(54) METHOD AND APPARATUS FOR TALKING FACE VIDEO COMPRESSION

(71) Applicant: Alibaba Damo (Hangzhou) Technology Co., Ltd., Zhejiang (CN)

(72) Inventors: Bolin Chen, Hong Kong (HK); Zhao Wang, Beijing (CN); Yan Ye, San Diego, CA (US); Shiqi Wang, Hong Kong (HK)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 49 days.

(21) Appl. No.: 18/484,099

(22) Filed: Oct. 10, 2023

(65) Prior Publication Data

US 2024/0146963 A1  May 2, 2024

Related U.S. Application Data

(60) Provisional application No. 63/379,779, filed on Oct. 17, 2022.

(51) Int. Cl.
| | |
|---|---|
| *H04N 19/597* | (2014.01) |
| *H04N 19/137* | (2014.01) |
| *H04N 19/172* | (2014.01) |

(52) U.S. Cl.
CPC ......... *H04N 19/597* (2014.11); *H04N 19/137* (2014.11); *H04N 19/172* (2014.11)

(58) Field of Classification Search
CPC ... H04N 19/597; H04N 19/137; H04N 19/172
See application file for complete search history.

(56) References Cited

U.S. PATENT DOCUMENTS

| | | | |
|---|---|---|---|
| 2019/0200046 A1* | 6/2019 | Lucas | H04N 19/176 |
| 2020/0234480 A1* | 7/2020 | Volkov | G06V 40/171 |
| 2022/0217371 A1 | 7/2022 | Jiang et al. | |

(Continued)

FOREIGN PATENT DOCUMENTS

| | | | | |
|---|---|---|---|---|
| CN | 1384469 A | * | 12/2002 | ............. H04N 19/20 |
| CN | 109271933 A | | 1/2019 | |
| CN | 109417635 A | * | 3/2019 | ........... H04N 19/597 |

(Continued)

OTHER PUBLICATIONS

Agrawal, Vasu translation TW 202301277 A Mar. 30, 2022 (Year: 2022).*

(Continued)

*Primary Examiner* — Zaihan Jiang
(74) *Attorney, Agent, or Firm* — Finnegan, Henderson, Farabow, Garrett & Dunner, LLP

(57) ABSTRACT

Methods and apparatuses are provided for processing video data. An exemplary method includes: decompressing a compressed frame to generate a key frame representing a face; generating, for the key frame, a first set of parameters associated with a 3-dimensional (3D) face representation of the face; reconstructing, for each of one or more inter frames, a second set of parameters associated with a 3D face representation of the face according to compressed interpredicted residuals of the second set of parameters; and generating a video comprising the face based on the key frame, the first set of parameters, and the second set of parameters.

20 Claims, 17 Drawing Sheets

(56) References Cited

U.S. PATENT DOCUMENTS

2022/0392133 A1* 12/2022 Volkov ............... G06V 40/161

FOREIGN PATENT DOCUMENTS

| CN | 110415341 | A | | 11/2019 | |
|---|---|---|---|---|---|
| CN | 114363623 | A | | 4/2022 | |
| CN | 114882545 | A | * | 8/2022 | ........... G06V 40/171 |
| TW | 202301277 | A | * | 1/2023 | ............ G06N 3/045 |
| WO | 2013148002 | A2 | | 10/2013 | |

OTHER PUBLICATIONS

Zhang, Hui translation CN 114882545 A Mar. 31, 2022 (Year: 2022).*

Kim, Seong-Jin translation CN 1384469 A Feb. 28, 2002 (Year: 2002).*

Zhao, Zhi-jie translation CN 109417635 A Jun. 17, 2016 (Year: 2016).*

Ahmed et al., "Discrete cosine transform," IEEE transactions on Computers, vol. 100, No. 1, pp. 90-93, 1974.

Balle et al., End-to-End Optimized Image Compression, ICLR, 2017, 27 pages.

Balle et al., "Density modeling of images using a generalized normalization transformation," ICLR, 14 pages, 2016.

Blanz et al., "A morphable model for the synthesis of 3d faces," in Proceedings of the 26th annual conference on Computer graphics and interactive techniques, 1999, pp. 187-194.

Bross et al., "Overview of the Versatile Video Coding (VVC) Standard and Its Applications," IEEE Transactions on Circuits and Systems for Video Technology, vol. 31, No. 10, pp. 3736-3764, 2023.

Chen et al., "Beyond key-point coding: Temporal evolution inference with compact feature representation for talking face video compression," in Proceedings of the IEEE Data Compression Conference, 10 pages, 2022.

Cleary et al., "Data compression using adaptive coding and partial string matching," IEEE Transactions on Communications, vol. 32, No. 4, pp. 396-402, 1984.

Deng et al., "ArcFace: Additive Angular Margin Loss for Deep Face Recognition," CVPR, 2019, 4690-4699.

Ding et al., "Image Quality Assessment: Unifying Structure and Texture Similarity," IEE Transactions on Pattern Analysis and Machine Intelligence, vol. 44, No. 5, May 2022.

Doukas et al., ,"HeadGAN: One-shot Neural Head Synthesis and Editing," Proceedings of 2021 IEEE/CVF International Conference on Computer Vision (ICCV), 14398-14407, 2021.

Feng et al., "A generative compression framework for low bandwidth video conference," in ICME Workshop, 6 pages 2021.

Gondal et al., "The unreasonable effectiveness of texture transfer for single image super-resolution," ECCV, 2018, 17 pages.

Goodfellow et al., "Generative adversarial nets," Advances in neural information processing systems, vol. 27, 9 pages, 2014.

Hu et al., "FVC: A New Framework towards Deep Video Compression in Feature Space," Proceedings of the IEEE/CVF Conference on Computer Vision and Pattern Recognition, 2021, pp. 1502-1511.

Jia et al., "Content-Aware Convolutional Neural Network for In-Loop Filtering in High Efficiency Video Coding," IEEE Transactions on Image Processing, vol. 28, No. 7, pp. 3343-3356 (2019).

Kingma et al., "Auto-encoding variational bayes," in Proceedings of the 2nd International Conference on Learning Representations (ICLR), 2014, p. 14.

Koufakis et al., "Very low bit rate face video compression using linear combination of 2d face views and principal components analysis," Image and Vision computing, vol. 17, No. 14, pp. 1031-1051, 1999.

Li et al., "Efficient, Multiple-Line-Based Intra Prediction for HEVC," IEEE Transactions on Circuits and Systems for Video Technology, vol. 28, No. 4, pp. 947-957, 2016.

Lin et al., "M-LVC: multiple frames prediction for learned video compression," in Proceedings of the IEEE/CVF Conference on Computer Vision and Pattern Recognition, 2020, pp. 3546-3554.

Lopez et al., "Head pose computation for very low bitrate video coding," in International Conference on Computer Analysis of Images and Patterns. Springer, 1995, pp. 440-447.

Lu et al. "DVC: An end-to-end deep video compression framework," In Proceedings of the IEEE Conference on Computer Vision and Pattern Recognition, pp. 11006-11015, 2019.

Lu et al., "Content adaptive and error propagation aware deep video compression," European Conference on Computer Vision. Springer, 2020, pp. 456-472.

Ma et al. "Convolutional neural network-based arithmetic coding for hevc intra-predicted residues," IEEE Transactions on Circuits and Systems for Video Technology, vol. 30, No. 7, pp. 1901-1916, 2019.

Oquab et al., "Low bandwidth video-chat compression using deep generative models," in Proceedings of the IEEE/CVF Conference on Computer Vision and Pattern Recognition, 2021, pp. 2388-2397.

Ronneberger et al., "U-net: Convolutional networks for biomedical image segmentation," in Medical Image Computing and Computer-Assisted Intervention, 8 pages, 2015.

Siarohin et al., "First Order Motion Model for Image Animation," Advances in Neural Information Processing Systems, vol. 32, pp. 7137-7147, 2019.

Sullivan et al., "Overview of the High Efficiency Video Coding (HEVC) Standard," IEE Transactions on Circuits and Systems for Video Technology, vol. 22, No. 12, pp. 1649-1668 (2012).

Teuhola, Jukka, "A Compression Method for Clustered Bit-Vectors," Information Processing Letters, vol. 7, No. 6, pp. 308-311, 1978.

Torres et al., "A proposal for high compression of faces in video sequences using adaptive eigenspaces," in International Conference on image Processing. IEEE, 2002, vol. 1.

Tripathy et al., "FACEGAN: Facial Attribute Controllable rEnactment GAN," 2021 IEEE Winter Conference on Applications of Computer Vision (WACV), 2021, pp. 1329-1338.

Wang et al., "One-shot free-view neural talking-head synthesis for video conferencing," in Proceedings of the IEEE/CVFConference on Computer Vision and Pattern Recognition, 2021, pp. 10039-10049.

Wang et al., "Few-shot video-to-video synthesis.," in NeurIPS, 2019, 14 pages.

Wiegand et al., "Overview of the H.264/AVC Video Coding Standard," IEEE Transactions on Circuitds and Systems for Video Technology, vol. 13, No. 7, Jul. 2003, pp. 560-576.

Wiles et al., "X2face: A network for controlling face generation using images, audio, and pose codes," in Proceedings of the European conference on computer vision (ECCV), 2018, pp. 670-686.

Yang et al., "Learning for video compression with hierarchical quality and recurrent enhancement," in Proceedings of the IEEE/CVF Conference on Computer Vision and Pattern Recognition, 2020, pp. 6628-6637.

Yang et al., "Learning for video compression with recurrent auto-encoder and recurrent probability model," IEEE Journal of Selected Topics in Signal Processing, vol. 15, No. 2, pp. 388-401, 2020.

Yang et al., "Face2Face : Real-Time High-Resolution One-Shot Face Reenactment," Proceedings of 2022 European Conference on Computer Vision, 17 pages.

Yao et al., "Mesh Guided One-shot Face Reenactment Using Graph Convolutional Networks." In Proceedings of the 28th ACM International Conference on Multimedia, 17 pages, 2020.

Zakharov et al., "Few-shot adversarial learning of realistic neural talking head models," in Proceedings of the IEEE/CVF International Conference on Computer Vision, 2019,pp. 9459-9468.

Zhang et al., "Weakly-Supervised Multi-Face 3D Reconstruction," arXiv: Computer Vision and Pattern Recognition, 2021, 9 pages.

Zhao et al., Enhanced Bi-Prediction with convolutional neural network for high-efficiency video coding, IEEE Transactions on Circuits and Systems for Video Technology, vol. 29, No. 11, pp. 3291-3301, 2018.

(56) References Cited

OTHER PUBLICATIONS

Zhu et al., "Generative adversarial network-based intra prediction for video coding," IEEE transactions on multimedia, vol. 22, No. 1, pp. 45-58, 2019.
PCT International Search Report and Written Opinion mailed Dec. 20, 2023, issued in corresponding International Application No. PCT/CN2023/124879 (7 pages).
Li et al., "Detail 3D Face Reconstruction Based on 3DMM and Displacement Map, "Journal of Sensors, 13 pages, 2021.

* cited by examiner

METHOD AND APPARATUS FOR TALKING FACE VIDEO COMPRESSION

CROSS-REFERENCE TO RELATED APPLICATIONS

The disclosure claims the benefits of priority to U.S. Provisional Application No. 63/379,779, filed on Oct. 17, 2022, which is incorporated herein by reference in its entirety.

TECHNICAL FIELD

The present disclosure generally relates to video processing, and more particularly, to methods and apparatuses for talking face video compression.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard, AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide methods for decoding video data. The method includes: decompressing a compressed frame to generate a key frame representing a face; generating, for the key frame, a first set of parameters associated with a 3-dimensional (3D) face representation of the face; reconstructing, for each of one or more inter frames, a second set of parameters associated with a 3D face representation of the face according to compressed inter-predicted residuals of the second set of parameters; and generating a video comprising the face based on the key frame, the first set of parameters, and the second set of parameters.

Embodiments of the present disclosure provide methods for encoding video data. The method includes: compressing a key frame representing a face; extracting, from one or more inter frames, a set of parameters associated with a 3-dimensional (3D) face representation; and compressing inter-predicted residuals of the set of parameters.

Embodiments of the present disclosure provide an apparatus for decoding video data. The apparatus includes: a decoder configured to decompressing a compressed frame to generate a key frame representing a face; an extractor configured to generate, for the key frame, a first set of parameters associated with a 3-dimensional (3D) face representation of the face; and to reconstruct, for each of one or more inter frames, a second set of parameters associated with a 3D face representation of the face according to compressed inter-predicted residuals of the second set of parameters; and a generator configured to generate a video comprising the face based on the key frame, the first set of parameters, and the second set of parameters.

Embodiments of the present disclosure provide an apparatus for encoding video data. The apparatus includes: an encoder configured to compress a key frame representing a face; an extractor configured to extract, from one or more inter frames, a set of parameters associated with a 3-dimensional (3D) face representation; and a coding module configured to compress inter-predicted residuals of the set of parameters.

Embodiments of the present disclosure provide an apparatus for decoding video data. The apparatus includes: a memory configured to store instructions; and one or more processors configured to execute the instructions to cause the apparatus to perform: decompressing a compressed frame to generate a key frame representing a face; generating, for the key frame, a first set of parameters associated with a 3-dimensional (3D) face representation of the face; reconstructing, for each of one or more inter frames, a second set of parameters associated with a 3D face representation of the face according to compressed inter-predicted residuals of the second set of parameters; and generating a video comprising the face based on the key frame, the first set of parameters, and the second set of parameters.

Embodiments of the present disclosure provide an apparatus for encoding video data. The apparatus includes: a memory configured to store instructions; and one or more processors configured to execute the instructions to cause the apparatus to perform: compressing a key frame representing a face; extracting, from one or more inter frames, a set of parameters associated with a 3-dimensional (3D) face representation; and compressing inter-predicted residuals of the set of parameters.

Embodiments of the present disclosure provide an apparatus for decoding video data. The apparatus includes a memory configured to store instructions; and one or more processors configured to execute the instructions to cause the apparatus to perform: receiving a bitstream comprising 3-dimensional (3D) parameters; reconstructing a 3D mesh according to the 3D parameters; learning an optical flow for synthesis; and reconstructing the video.

Embodiments of the present disclosure provide methods for encoding video data. The method includes: compressing a key frame representing a face; extracting, from one or more inter frames, a set of parameters associated with a 3-dimensional (3D) face representation; and compressing inter-predicted residuals of the set of parameters.

Embodiments of the present disclosure provide a non-transitory computer readable storage medium storing a bitstream of a video. The bitstream includes a set of parameters associated with a 3-dimensional (3D) face representation. The set of parameters, when decoded by a decoder, causes the decoder to perform a method including decompressing a compressed frame to generate a key frame representing a face; generating, for the key frame, a first set of parameters associated with a 3-dimensional (3D) face representation of the face; reconstructing, for each of one or more inter frames, a second set of parameters associated with a 3D face representation of the face according to compressed inter-predicted residuals of the second set of parameters; and generating a video comprising the face based on the key frame, the first set of parameters, and the second set of parameters.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms or definitions incorporated by reference.

Various image/video coding standards, such as JPEG, JPEG2000, the H.264/MPEG4 part 10, Audio Video coding Standard (AVS), and the H.265/HEVC standard, have been developed for performing image/video compression. Currently, a new Versatile Video Coding (VVC) standard is under development to further improve video coding efficiency. VVC is based on the same hybrid video coding system that has been used in modern video compression standards such as HEVC, H.264/AVC, MPEG2, H.263, etc. All of the above standards use a hybrid coding framework which includes intra/inter prediction, transform, quantization and entropy coding is used to exploit the spatial/temporal redundancy, visual redundancy, and statistic redundancy in image/video.

Traditional compression algorithms compress every video frame by using block-based motion-estimation, Discrete Cosine Transform (DCT), and others. In addition, traditional or learning-based end-to-end video compression methods aim at the universal natural scenes without the specific consideration of the human motion information. For these existing 2D generative compression algorithms, it is not supported to include semantic information to control head movement posture in the compressed code stream. However, the need for an ultra-low bit-rate talking face communication is growing.

Figure 1:
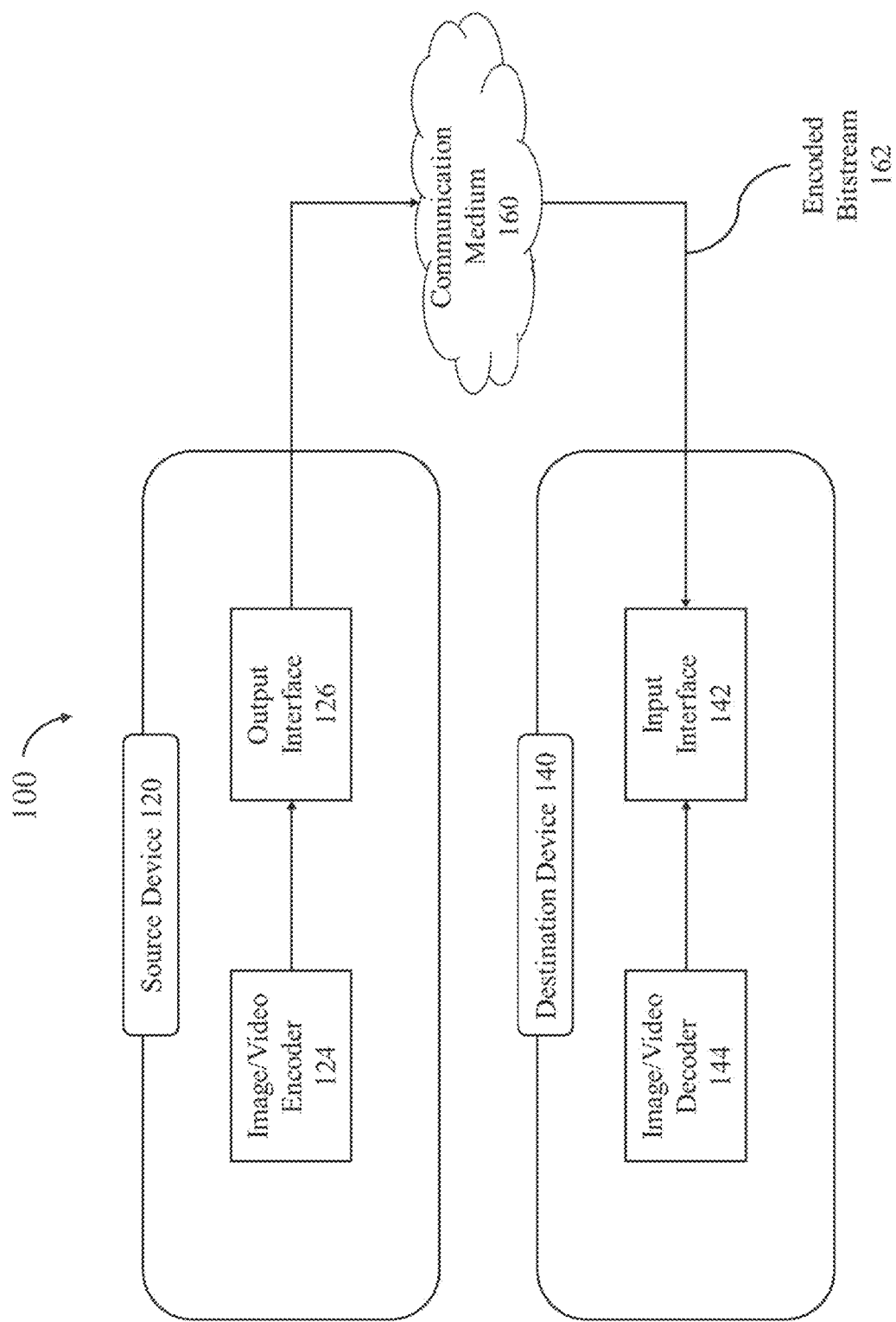
FIG. 1 is a schematic diagram illustrating an exemplary system for coding image data, according to some embodiments of the present disclosure.

FIG. 1 is a block diagram illustrating a system 100 for coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video encoder 124 an output interface 126. Destination device 140 may include an input interface 142 and an image/video decoder 144. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data.

More specifically, source device 120 may further include various devices (not shown) for providing source image data to be processed by Image/video encoder 124. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Next, exemplary image data encoding and decoding techniques (such as those utilized by image/video encoder 124 and image/video decoder 144) are described in connection with FIGS. 2A-2B and FIGS. 3A-3B.

Figure 2A:
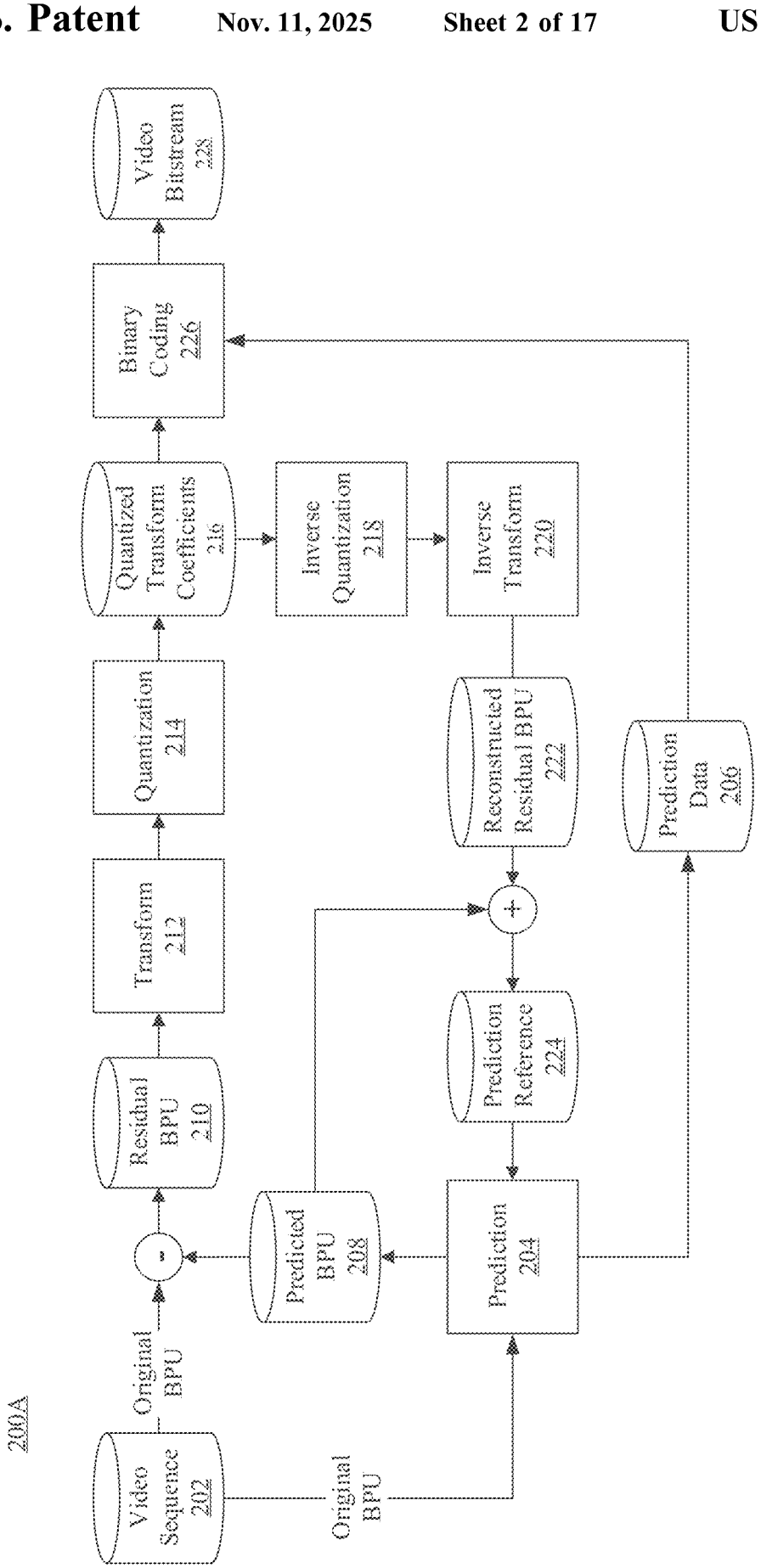
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
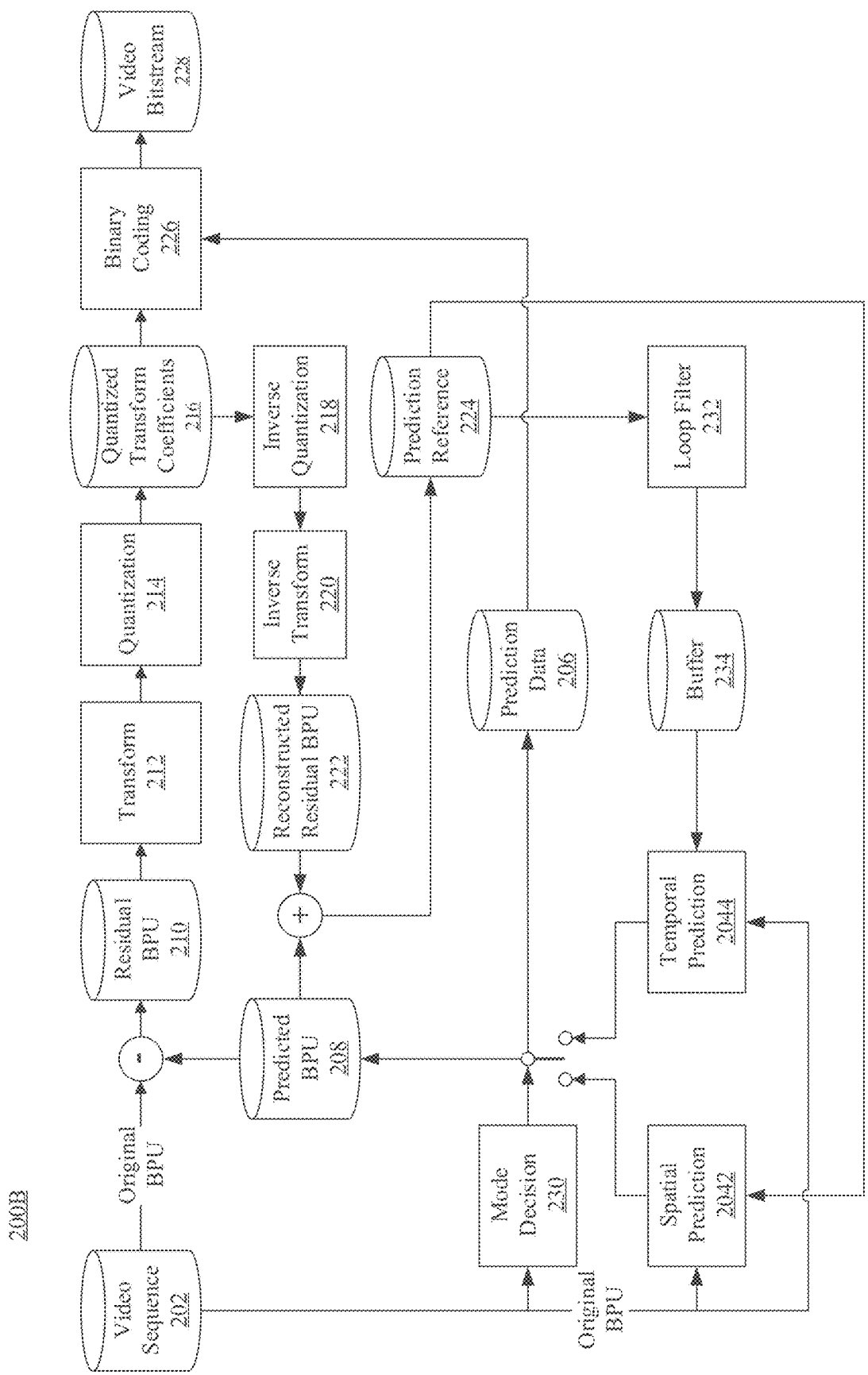
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
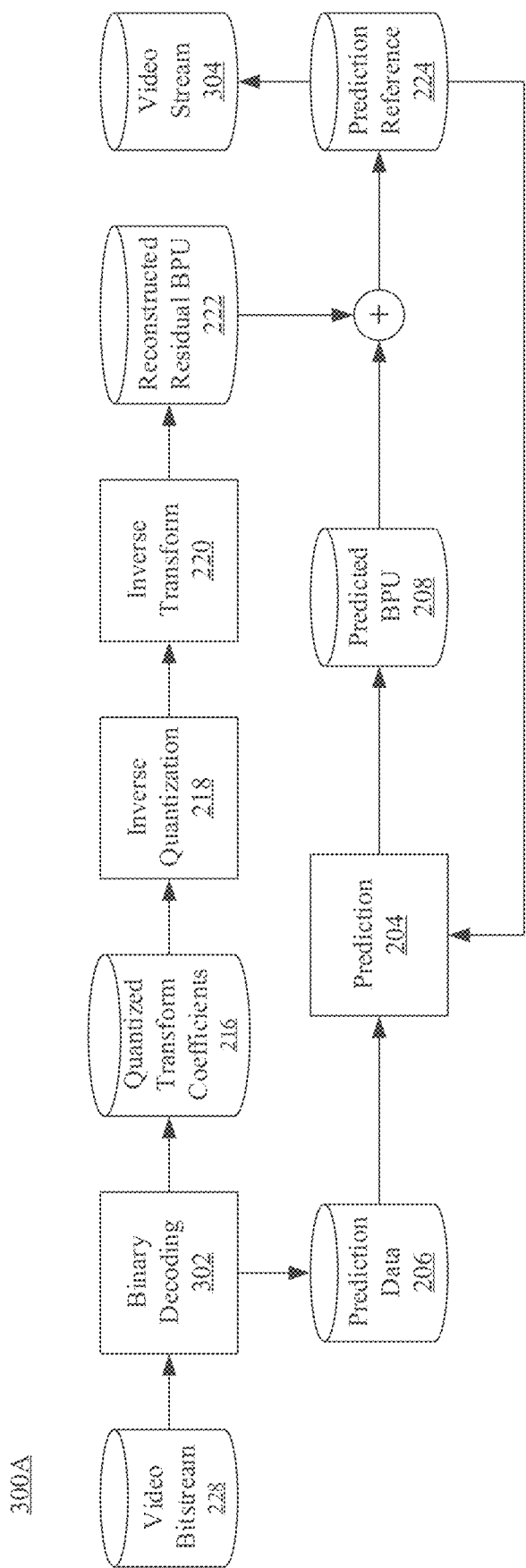
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
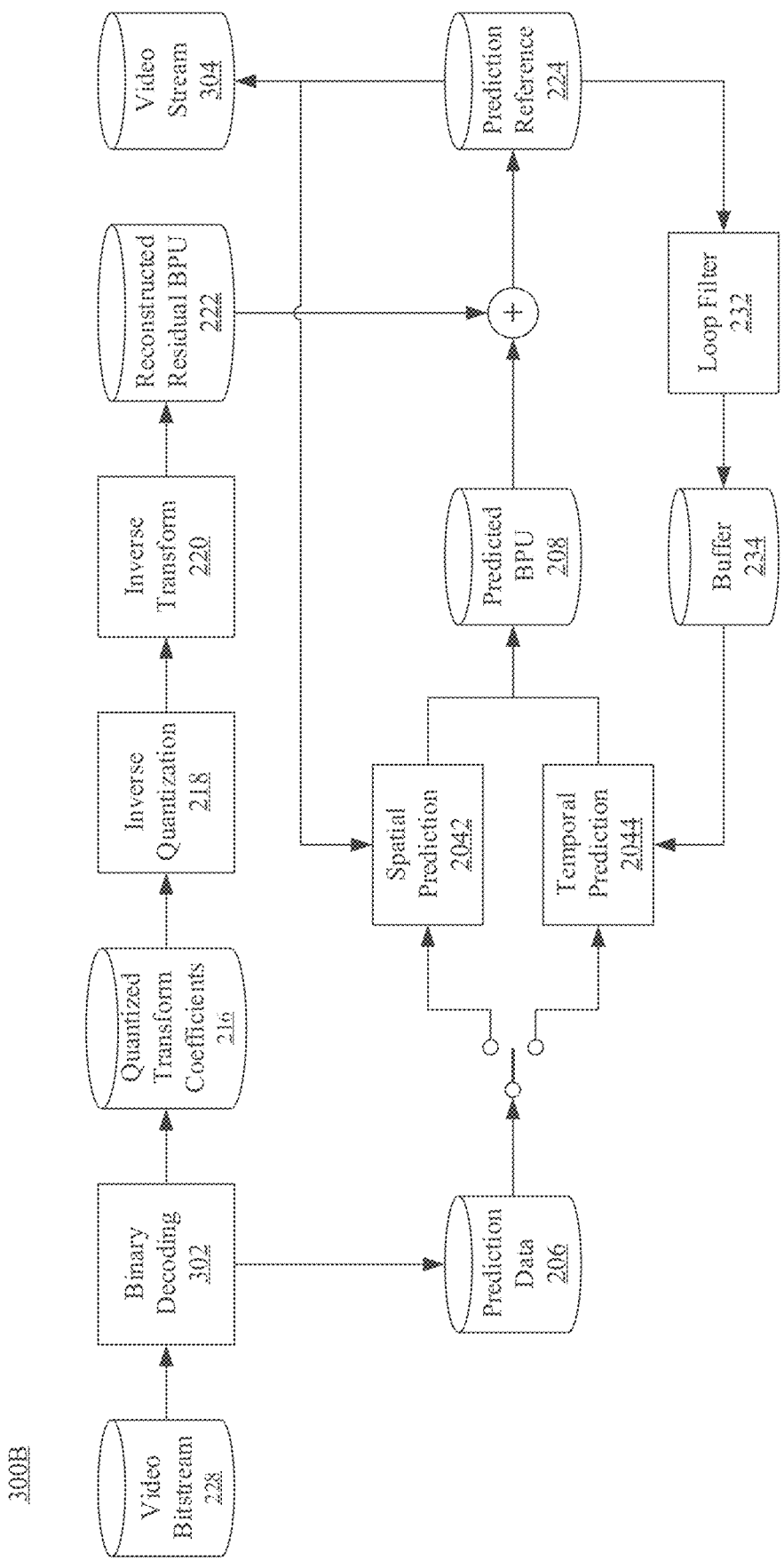
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
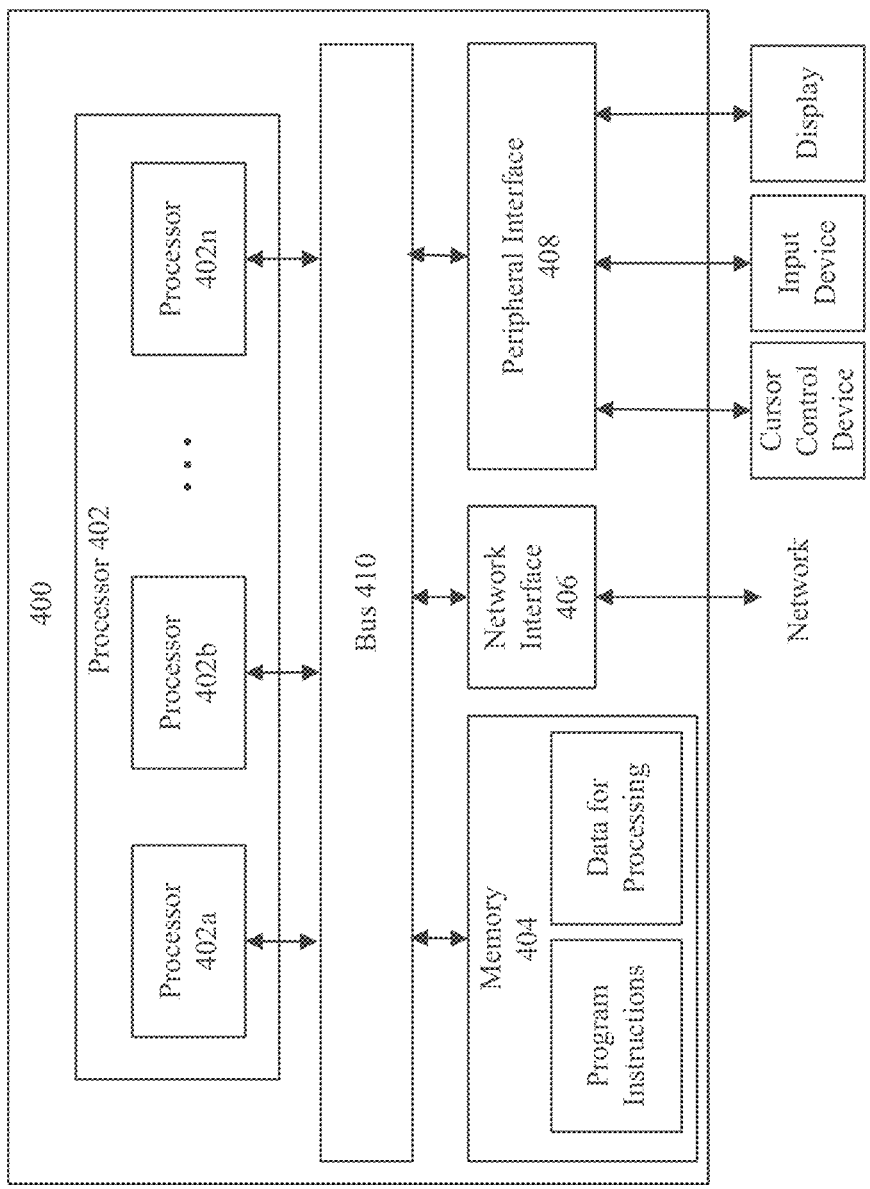
FIG. 4 is a block diagram of an exemplary apparatus for coding image data, according to some embodiments of the present disclosure.

Referring back to FIG. 1, each image/video encoder 124 and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be an encoder, or a decoder. As shown in FIG. 4, apparatus 400 can include processor 402. When processor 402 executes instructions described herein, apparatus 400 can become a specialized machine for encoding or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

Consistent with the disclosed embodiments, deep learning can be used in image and video compression, to achieve competitive performance compared with traditional compression schemes. For example, end-to-end image compression algorithms show better rate-distortion (RD) performance than JPEG, JPEG2000 and even HEVC due to end-to-end training and non-linear transform. Moreover, the video compression algorithms based on Deep Neural Networks (DNNs), such as deep video compression model (DVC), can achieve promising RD performance. These schemes can work without the prior knowledge of the video content. Regarding the applications of video conferencing/ telephone, deep generative models, such as First Order Motion Model (FOMM) and Face Video-to-Video Synthesis (Face vid2vid), can achieve promising performance at ultra-low bit rate. In particular, these models leverage the fact that the variations of these videos typically lie in the human motion information, providing the strong priors that can be used in frame synthesis. These features are described by the variations of human structures, such as landmarks or key points, and are further conveyed to animate the reference frame and generate the human motion video.

Despite their achievements, the above deep learning techniques rely on the key-points or landmarks with explicit representation from the perspective of 2-dimension face representation instead of 3-dimension, thereby limiting the performance in rendering high quality videos and the following-up applications. Specifically, with the development of the meta universe, coinciding with the popularization of the digital human character in numerous applications, the real-world video communication system is applied into the meta universe market, and therefore the corresponding control functions (e.g., pose control, expression control and etc.) are necessary. However, these 2D generative compression algorithms cannot support the need of meta universe due to the limitation of face representation. For better rate-distortion performance of 3D human communication and more-promising application market, prior information of 3D face provided by the 3D Morphable Models (3DMM) has been explored in the last few years, such as HeadGAN, Face2Facep, MeshGAN, FACEGAN and etc. These 3DMM-based generative algorithms not only can achieve ultra-low bitrate talking face video compressing, but also can control pose and expression for interesting applications.

The traditional video compression standards, such as Advanced Video Coding (AVC), HEVC, and VVC, have been developed to achieve excellent compression performance. In all these standards, a block-based hybrid video coding framework is used to exploit the spatial redundancy, temporal redundancy and information entropy redundancy in video.

Figure 5:
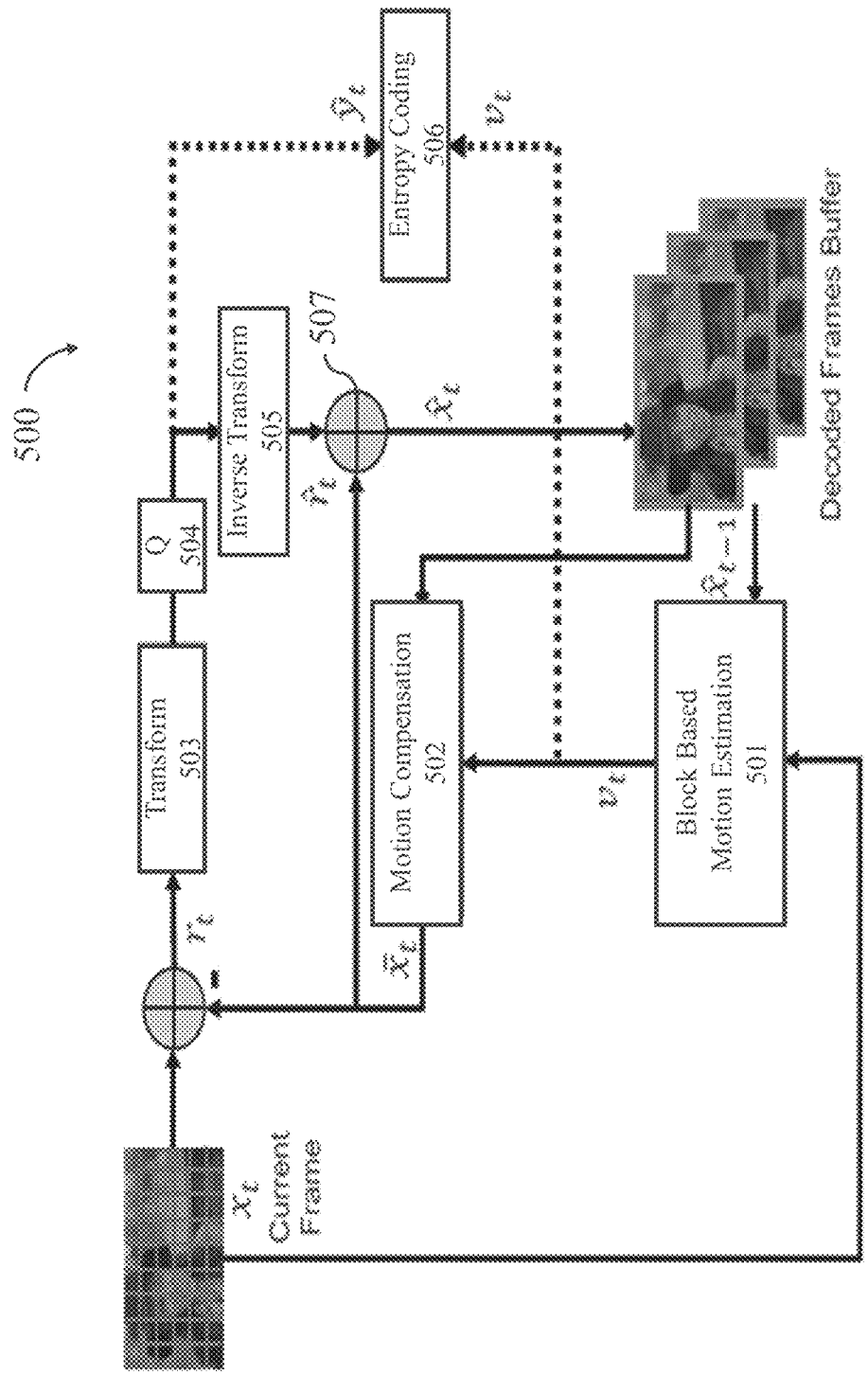
FIG. 5 is a schematic diagram illustrating an architecture of a traditional video compression framework.

Generally, the video compression encoder generates the bitstream based on the input current frames. And the decoder reconstructs the video frames based on the received bitstreams. FIG. 5 is a schematic diagram illustrating an architecture of a traditional video compression framework. FIG. 5 illustrates a classic framework of video compression follows the predict-transform architecture.

Specifically, the input frame x t is split into a set of blocks, e.g., square regions, of the same size (e.g., 8×8). The encoding procedure of the traditional video compression algorithm in the encoder 500 side includes the following steps.

Motion estimation by block based motion estimation module 501 of the encoder 500: The motion estimation module 501 can estimate the motion between the current frame $x_t$ and the previous reconstructed frame $\hat{x}_{t-1}$. The corresponding motion vector $v_t$ for each block is obtained.

Motion compensation by motion compensation module 502 of the encoder 500: The predicted frame $\bar{x}_t$ is obtained by copying the corresponding pixels in the previous reconstructed frame to the current frame based on the motion vector $v_t$ determined by motion estimation module 501. Then, the residual $r_t$ between the original frame $x_t$ and the predicted frame $\bar{x}_t$ is obtained as $r_t = x_t - \bar{x}_t$.

Transform and quantization by transform module 503 and Q module 504 of the encoder 500, respectively: The residual $r_t$ is quantized to $\hat{y}_t$ by Q module 504. A linear transform (e.g., DCT) is used before quantization by transform module 503 for better compression performance.

Inverse transform by inverse transform module 505 of the encoder 500: The quantized result $\hat{y}_t$ is used by inverse transform for obtaining the reconstructed residual $\hat{r}_t$.

Entropy coding by entropy coding module 506 of the encoder 500: Both the motion vector $v_t$ and the quantized result $\hat{y}_t$ are encoded into bits by the entropy coding method and sent to the decoder.

Frame reconstruction by reconstruction module 507: The reconstructed frame $\hat{x}_t$ is obtained by adding $\bar{x}_t$ and $\hat{r}_t$, i.e., $\hat{x}_t = \hat{r}_t + \bar{x}_t$. The reconstructed frame will be used by the $(t+1)_{th}$ frame for motion estimation.

For the decoder (not shown), based on the bits provided by entropy coding module 506 of the encoder 500, motion compensation, inverse quantization, and then frame reconstruction are performed to obtain the reconstructed frame $\hat{x}_t$.

As described above, deep learning-based algorithms can be introduced to replace or enhance the traditional video coding tools, including intra/inter prediction, entropy coding and in-loop filtering. Regarding the joint optimization of the entire image/video compression framework rather than designing one particular module, end-to-end image/video compression algorithms can be used. For example, an end-to-end video coding scheme DVC scheme that jointly optimizes all the components for video compression can be used. Furthermore, to address the content adaptive and error propagation aware problems, an online encoder updating scheme can be used to improve the video compression performance. In addition, a FVC by developing all major modules of the end-to-end compression framework in the feature space can be used. Based on recurrent probability model and weighted recurrent quality enhancement network, a Recurrent Learning for Video Compression (RLVC) and HLVC can be used to exploit the temporal correlation among video frames. Four effective modules in Multiple Frames Prediction for Learned Video Compression (M-LVC) can be used. However, like the traditional video coding tools, these learning-based video compression methods aim at the universal natural scenes without the specific consideration of the human content, such as face, body or other parts.

Figure 6:
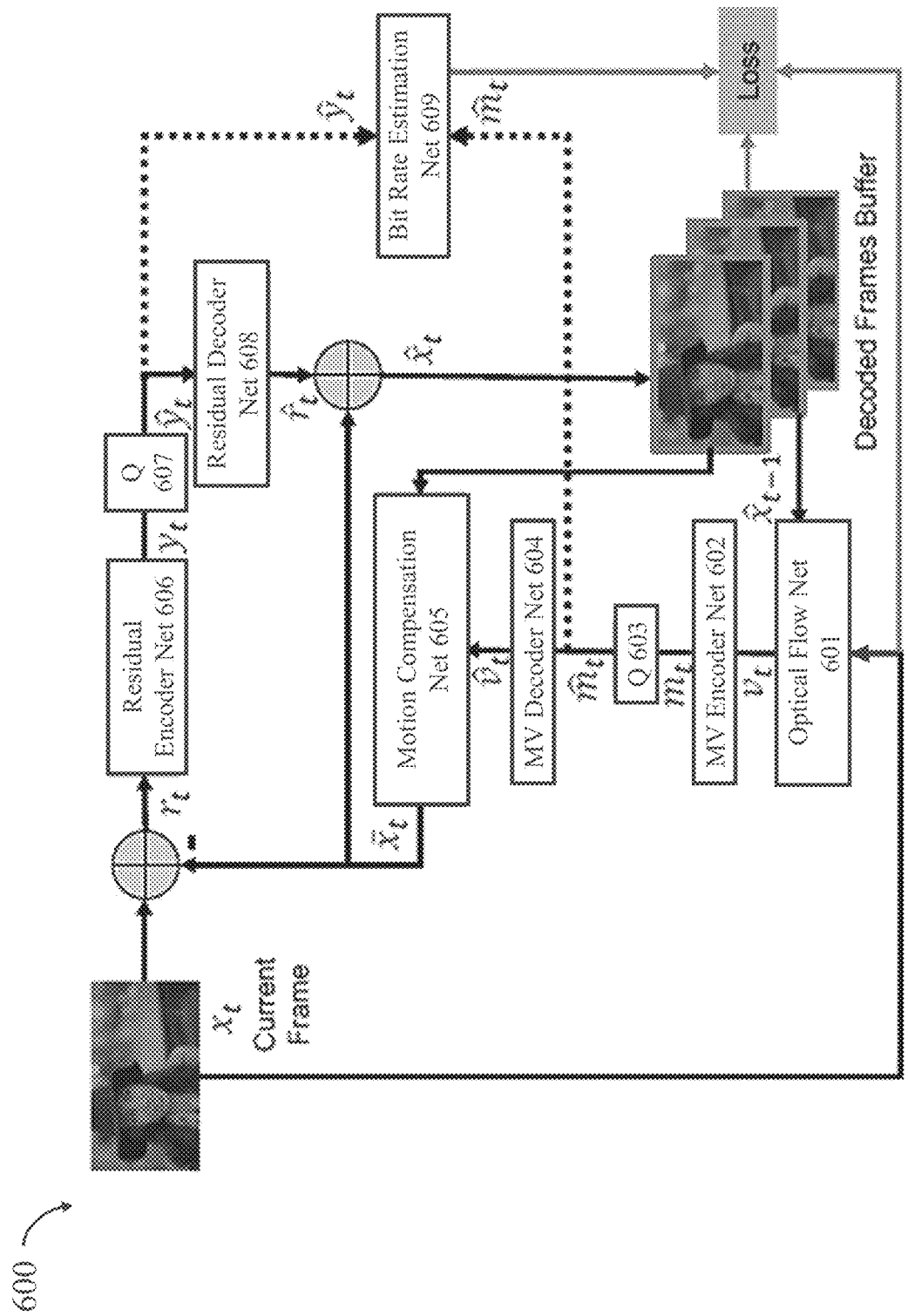
FIG. 6 is a schematic diagram illustrating an exemplary architecture of an end-to-end deep-based video compression framework, according to some embodiments of the present disclosure.

FIG. 6 is a schematic diagram illustrating an exemplary architecture of an end-to-end deep-based video compression framework, according to some embodiments of the present disclosure. FIG. 6 shows the basic framework of the first end-to-end video compression deep model that jointly optimizes all the components for video compression, such as motion estimation, motion compression, and residual compression. Specifically, learning based optical flow estimation is utilized to obtain the motion information and reconstruct the current frames. Then two auto-encoder style neural networks are employed to compress the corresponding motion and residual information. All the modules are jointly learned through a single loss function, in which they collaborate with each other by considering the trade-off between reducing the number of compression bits and improving quality of the decoded video. There is one-to-one correspondence between the traditional video compression framework shown in FIG. 5 and the novel end-to-end deep-based framework shown in FIG. 6. The relationship and brief summarization on the differences are introduced as follows. The procedure of encoder 600 may include the following steps.

Motion estimation and compression: In optical flow net module 601, a CNN (Convolutional Neural Network) model can be used to estimate the optical flow, which is considered as motion information $v_t$. Instead of directly encoding the raw optical flow values, an MV encoder-decoder network to compress and decode the optical flow values. Firstly, MV encoder net module 602 can be used to encode the motion information $v_t$. The encoded motion representation of motion information $v_t$ is $m_t$, which can be further quantized, by Q module 603, as $\hat{m}_t$. Then the corresponding reconstructed motion information $\hat{v}_t$ can be decoded by using MV decoder net module 604.

Motion compensation. A motion compensation network donated as motion compensation net module 605 is designed to obtain the predicted frame $\bar{x}_t$ based on the optical flow obtained. Then, the residual $r_t$ between the original frame $x_t$ and the predicted frame $\bar{x}_t$ is obtained as $r_t = x_t - \bar{x}_t$.

Transform, quantization and inverse transform: The linear transform is replaced by using a highly non-linear residual encoder-decoder network, such as the residual encoder net module 606 shown in FIG. 6, and the residual $r_t$ is non-linearly mapped to the representation $y_t$. Then $y_t$ is quantized to $\hat{y}_t$ by Q module 607. In order to build an end-to-end training scheme, the quantization method is used. The quantized representation $\hat{y}_t$ is fed into the residual decoder network donated as residual decoder net module 608 to obtain the reconstructed residual $\hat{r}_t$.

Entropy coding: At the testing stage, the quantized motion representation $\hat{m}_t$ and the residual representation $\hat{y}_t$ are coded into bits by bit rate estimation net module 609 and sent to the decoder. At the training stage, to estimate the number of bits cost, the CNNs are used to obtain the probability distribution of each symbol in $\hat{m}_t$ and $\hat{y}_t$.

Moreover, the loss of the encoder 600 can be determined according to the original frame, the reconstructed frame and the encoded frame. The loss determined here can also be used to refine the networking within the encoder 600 for achieving a better performance.

Frame reconstruction (not shown): It is the same as the traditional method.

With the emergence of deep generative models including Variational Auto-Encoding (VAE) and Generative Adversarial Networks (GAN), the facial video compression can achieve promising performance improvement. For example, X2Face can be used to control face generation via images, audio, and pose codes. Besides, realistic neural talking head models can be used via few-shot adversarial learning. For video-to-video synthesis tasks, Face-vidtovid can be used. Moreover, schemes that leverage compact 3D keypoint representation to drive a generative model for rendering the target frame can also be used. Moreover, mobile-compatible video chat systems based on FOMM can be used. VSBNet that utilizes the adversarial learning to reconstruct origin frames from the landmarks can also be used. In addition, an end-to-end talking-head video compression framework based upon compact feature learning (CFTE), designed for high efficiency talking face video compression towards ultra low bandwidth scenarios can be used. The CFTE scheme leverages the compact feature representation to compensate for the temporal evolution and reconstruct the target face video frame in an end-to-end manner. Moreover, the CFTE scheme can be incorporated into the video coding framework with the supervision of rate-distortion objective. Although these algorithms realize frame reconstruction with a few facial parameters through the powerful rendering ability of deep generative models, some head posture movements and facial expression movements still fail to be accurately rendered compared with the original moving video.

Figure 7:
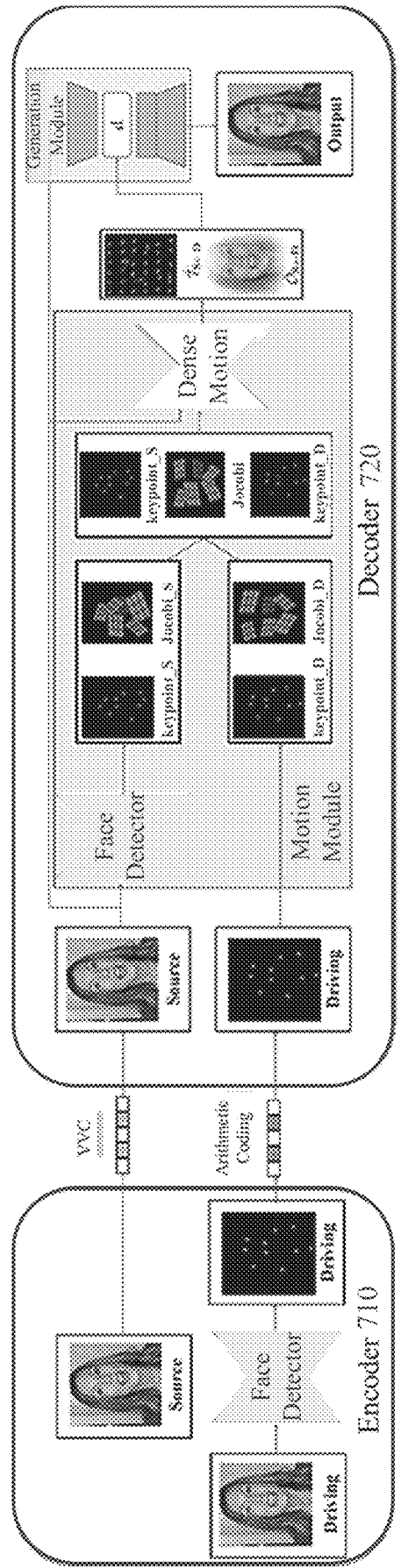
FIG. 7 is a schematic diagram illustrating another exemplary architecture of the end-to-end deep-based video generative compression framework.

FIG. 7 is a schematic diagram illustrating another exemplary architecture of the deep-based video generative compression framework, according to some embodiments of the present disclosure. FIG. 7 gives the basic framework of the deep-based video generative compression scheme based First Order Motion Model (FOMM). The FOMM deforms a reference source frame to follow the motion of a driving video. While this method works on various types of videos (for example, Tai-chi, cartoons), this method is typically focused on face animation application. FOMM follows an encoder-decoder architecture with a motion transfer component including the following steps.

Firstly, a keypoint extractor (also referred to motion module) is learned using an equivariant loss, without explicit labels. By this keypoint extractor, two sets of ten learned keypoints are computed for the source and driving frames. The learned keypoints is transformed from the feature map with the size of channel×64×64 via the Gaussian map function, thus every corresponding keypoint can represent different-channels feature information. It should be mentioned that every keypoint is point of (x,y) that can represent the most important information of feature map.

Secondly, a dense motion network uses the landmarks and the source frame to produce a dense motion field and an occlusion map.

Then, the encoder 710 encodes the source frame via the traditional image/video compression method, such as HEVC/VVC or JPEG/BPG. Here, the VVC is used to compress the source frame.

In the later stage, the resulting feature map is warped using the dense motion field (using a differentiable grid-sample operation), then multiplied with the occlusion map.

Lastly, the decoder 720 generates an image from the warped map.

Figure 8:
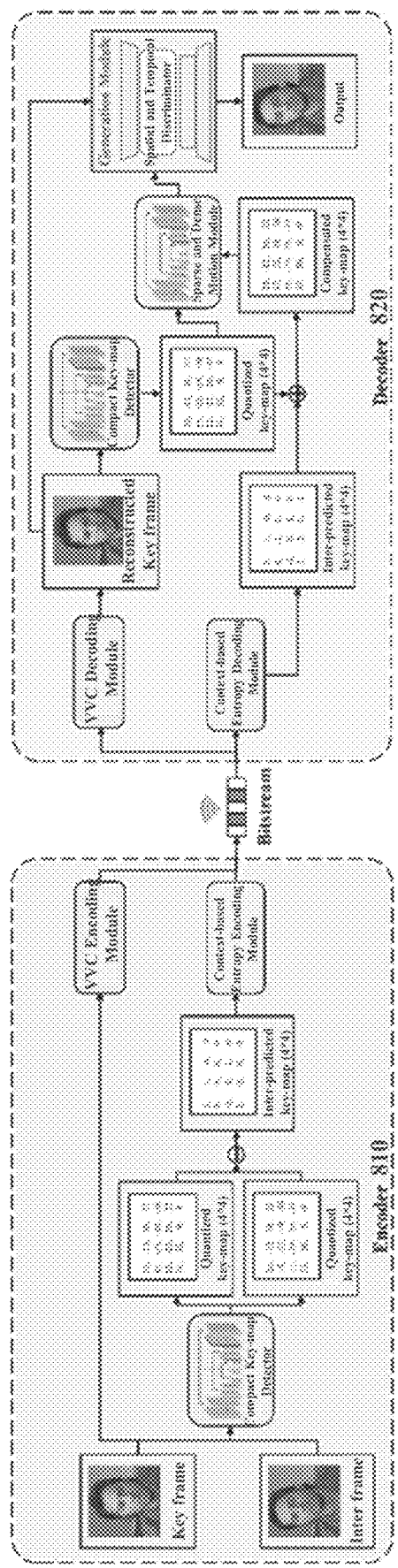
FIG. 8 is a schematic diagram illustrating an exemplary encoder-decoder coding framework with the 1×4×4 compact feature size for a talking face video, according to some embodiments of the present disclosure.

FIG. 8 is a schematic diagram illustrating an exemplary encoder-decoder coding framework with the 1×4×4 compact feature size for a talking face video, according to some embodiments of the present disclosure. FIG. 8 gives another basic framework of the deep-based video generative compression scheme based on compact feature representation, namely CFTE. It follows an encoder-decoder architecture which applies a context-based coding scheme.

At the encoder 810 side, the compression framework includes three modules: an encoder (also referred to as VVC encoding module) for compressing the key frame, a feature extractor for extracting the compact human features of the other inter frames, and a feature coding module for compressing the inter-predicted residuals of compact human features. First, the key frame that represents the human textures is compressed with the VVC encoder. Through the compact feature extractor, each of the subsequent inter frames is represented with a compact feature matrix with the size of 1×4×4. It should be mentioned that the size of compact feature matrix is not fixed and the number of feature parameters can also be increased or decreased according to the specific requirement of bit consumption. Then, these extracted features are inter-predicted and quantized, and the residuals are finally entropy-coded as the final bitstream.

At the decoder 820 side, this compression framework also contains three main modules, including decoding for reconstructing the key frame, the reconstruction of the compact features by entropy decoding and compensation, and the generation of the final video by leveraging the reconstructed features and decoded key frame. More specifically, during the generation of the final video, the decoded key frame from the VVC bitstream can be further represented in the form of features through compact feature extraction. Subsequently, given the features from the key and inter frames, relevant sparse motion field is calculated, facilitating the generation of the pixel-wise dense motion map and occlusion map. Finally, based on deep generative model, the decoded key frame, pixel-wise dense motion map and occlusion map with implicit motion field characterization are used to produce the final video with accurate appearance, pose, and expression.

To further pursue the coding performance, numerous studies focusing on 3D face have been conducted. A 3D head model is adopted and only the pose parameters for the task of face-specific video compression are encoded. Subsequently, both Eigenspaces and Principal Component Analysis (PCA) models have been used in this task. However, based on these traditional 3D techniques, the visual quality of the reconstructed images is unacceptable. With the development of deep generative models, this 3DMM-assisted face video generation task can provide promising results.

Figure 9:
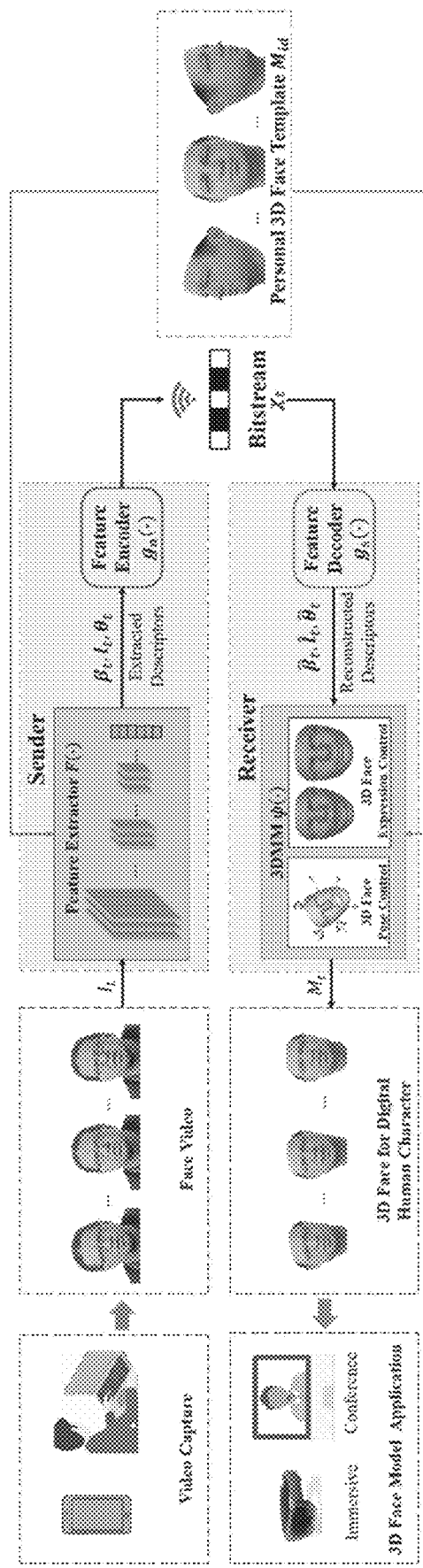
FIG. 9 is a schematic diagram illustrating a general encoder-decoder generative compression framework of 3DMM-assisted talking face video.

FIG. 9 is a schematic diagram illustrating a general encoder-decoder generative compression framework of 3DMM-assisted talking face video, according to some embodiments of the present disclosure. Generally speaking, the 3DMM-assisted face video generation can provide accurate 3D face reconstruction based on the combination of shape $S$ and texture $T$, which are given by:

$$S = S(\alpha, \beta) = \overline{S} + B_{id}\alpha + B_{exp}\beta$$

$$T = T(\delta) = \overline{T} + B_t\delta$$

where $\overline{S}$ and $\overline{T}$ denote average identity and texture, and the basis vectors of the identity, expression and texture space are represented with $B_{id}$, $B_{exp}$, $B_t$. The face identity, expression and texture are represented with the $\alpha$, $\beta$ and $\delta$, which are corresponding feature vectors to control the reconstructed face. Furthermore, the pose and position of the 3D face are controlled by angle $\theta$ and translation $l$. As a result, at the encoder side, the 3DMM parameters that serve as the feature descriptors of the 3D face are compressed. Furthermore, the decoder receives the bitstream to reconstruct 3DMM template (e.g., 3D face mesh, 3D face landmark and etc.). The reconstructed 3D information from source image and driving image are used as guidance to learn the optical flow needed for the re-enacted face synthesis.

While traditional or learning-based end-to-end video compression methods can achieve relatively high-efficiency compression performance in moving human videos, directly applying common compression algorithms into ultra-low bit-rate talking face video compression system has some drawbacks.

First, traditional compression algorithms compress every video frame by using block-based motion-estimation, Discrete Cosine Transform (DCT) and others, so that it is still difficult to further shrink the coding bits. As a result, this type of algorithms is not suitable for ultra-low bit-rate human video compression scene.

A second drawback is that these traditional or learning-based end-to-end video compression methods aim at the universal natural scenes without the specific consideration of the human motion information. In particular, the features from the talking face or the moving body are described by the variations of feature structures with strong priors, such as landmarks or key points, which can greatly help to reconstruct higher quality videos.

Although these generative compression algorithms, such as FOMM or Face_vidtovid have fully realized frame reconstruction with a few parameters through the powerful rendering ability of deep generative models, some head posture movements and facial expression movements still fail to be accurately rendered compared with the original talking-face or moving-body video. This is to say, most of them based on 2D face representation (i.e., 2D landmark and 2D key-point) either perform poorly in terms of photo-realism, or fail to meet the identity preservation problem, or do not fully transfer the driving pose and expression.

Furthermore, for these existing 2D generative compression algorithms including semantic information is not supported to control head movement posture in the compressed code stream. This drawback limits the application of human communication in the meta universe. On the other hand, for most of 3DMM-assisted generative models, the transmitted facial parameters are complex and thus need more compression bits, which cannot meet the ultra-low bandwidth communication scene.

To overcome these problems with a viable solution, a framework for ultra-low bit-rate talking face communication is provided by the present disclosure. The disclosed framework uses techniques for reconstructing the 3D face of digital human characters and is grounded on the assumption of the consistency and persistence of human appearance. This is to say, the disclosed 3DMM-assisted compression framework is based on a view that the temporal evolution of face videos can be well accounted by the 3D facial representation. In particular, such latent, compact and meaningful representations that are automatically learned can efficiently remove the redundancies and capture the temporal variations. This also aligns with the recent hypothesis in neuroscience research that the human visual system transforms the evolution of visual signals to the space that follows straighter temporal trajectories.

In particular, the related 3D face parameters that facilitate the reconstruction of 3D faces with ultra-low bit-rate conveyed are extracted and the 3D face template is stored at the receiver side. Subsequently, after receiving the bitstream and decoding 3DMM parameters, the 3D meshes (i.e., the source mesh and driving mesh) are reconstructed and guided to learn the optical flow needed for face synthesis. Technically, the driving face's identity information is explicitly excluded in the reconstructed driving mesh. In this way, the disclosed network can focus on the motion estimation for the source face without the interference of driving face shape. Finally, with the help of accurate motion estimation information and source appearance, the talking face video can be reconstructed. As such, the disclosed scheme enjoys the advantages of high flexibility, enhanced robustness and semantic control due to the digital character level representation and 3D face template-based rendering.

In some embodiments, a 3DMM-assisted talking face video compression scheme is proposed.

Figure 10:
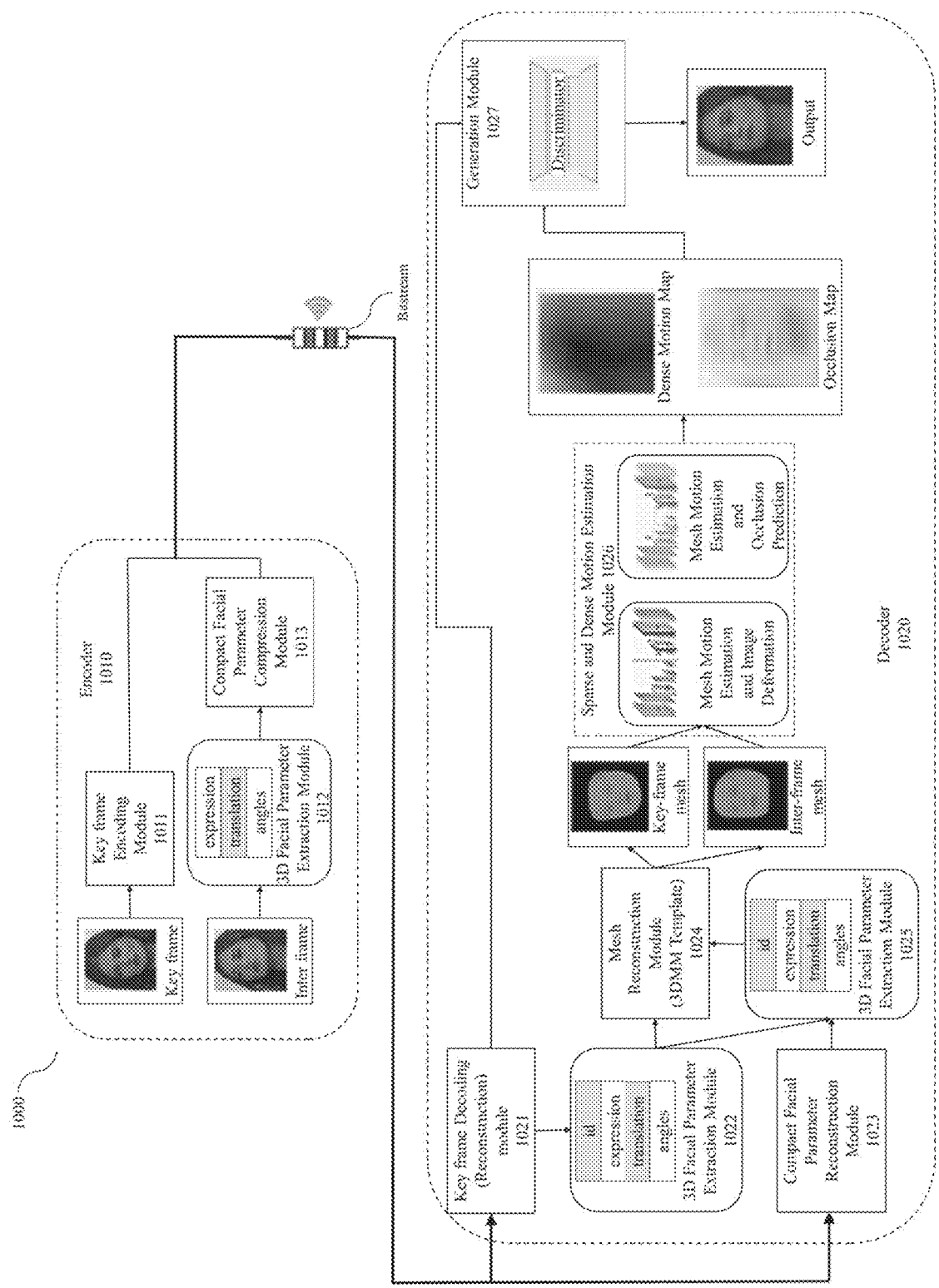
FIG. 10 is a schematic diagram illustrating an exemplary encoder-decoder generative compression framework for talking face video, according to some embodiments of the present disclosure.

FIG. 10 is a schematic diagram illustrating an exemplary encoder-decoder generative compression framework 1000 for talking face video, according to some embodiments of the present disclosure. Encoder-decoder generative compression framework 1000 can include encoder 1010 and decoder 1020.

As shown in FIG. 10, the pose-controlled generative compression framework 1000 based upon 3DMM, which is used to achieve ultra-low bit rate human video communication, is presented.

Functionalities of encoder 1010 can be implemented into source device 120 of FIG. 1, encoder 200A of FIG. 2A, encoder 200B of FIG. 2B. As shown in FIG. 10, encoder 1010 can include key frame encoding module 1011 (such as a VVC encoder using VVC coding techniques) for compressing the key frame, 3D facial parameter extraction module 1012 applying a 3DMM pretrained model (e.g., WM3DR) for extracting the relevant 3D parameters of the other inter frames, and compact facial parameter compression module 1013 (also referred to as feature coding module) for compressing the inter-predicted residuals of 3D face parameters. First, the key frame which represents the human textures is compressed with the key frame encoding module 1011. The compressed key frame is then filled in the bitstream sending to a receiver. Through 3D facial parameter extraction module 1012 applying the 3DMM pretrained model, each of the subsequent inter frames is represented with 3DMM parameters (e.g., expression parameter and pose parameter including translation parameters, angles parameters etc.). It should be mentioned that the size of compact 3D face parameter is not fixed and the number of expression parameters can also be increased or decreased according to the specific requirement of bit consumption. Then, these extracted features are inter-predicted and quantized by compact facial parameter compression module 1013, and the residuals are finally entropy-coded by compact facial parameter compression module 1013 and filled in the final bitstream.

Functionalities of decoder 1020 can be implemented into destination device 140 of FIG. 1, decoder 300A of FIG. 3A, decoder 300B of FIG. 3B. As shown in FIG. 10, Decoder 1020 can include key frame decoding (reconstruction) module 1021 for reconstructing the key frame, compact facial parameter reconstruction module 1023 for reconstructing the compact 3D facial parameters by entropy decoding and compensation, mesh reconstruction module 1024 applying a 3DMM template for reconstructing 3D meshes based on decoded 3D facial parameters, and generation module 1027 for generating the final video by leveraging the reconstructed 3D meshes and decoded key frame. In addition, 3D facial parameter extraction module 1022 may extract 3D facial parameters (e.g., identity (id), expression, translation, angles etc.) from the reconstructed key frame, while 3D facial parameter extraction module 1025 may generate 3D facial parameters for the inter frames by combining the reconstructed 3D facial parameters from compact facial parameter reconstruction module 1023 and the identity (id) information from 3D facial parameter extraction module 1022.

More specifically, during the generation of the final video, the decoded key frame from the VVC bitstream can be further represented in the form of 3D facial mesh through 3D facial parameter extraction and mesh reconstruction based on 3DMM pretrained model (e.g., such as the WM3DR model). Then, given mesh reconstruction module 1024 applying a 3D face template, the corresponding 3D facial meshes can be reconstructed based on the 3D facial features from the key frame and inter frames. Subsequently, using the reconstructed 3D meshes (i.e., the key-frame mesh and inter-frame mesh) as guidance, sparse and dense motion estimation module 1026 in decoder 1020 can generate the pixel-wise dense motion map and occlusion map. Finally, based on generation module 1027 such as a deep generative model including a discriminator, the decoded key frame, pixel-wise dense motion map and occlusion map with implicit motion field characterization are used to produce the output video with accurate appearance, pose, and expression.

In some embodiments, encoder 1010 can include a 3D facial parameter extraction module 1012 that is based on 3DMM.

Generally speaking, the 3DMM can provide accurate 3D face reconstruction based on the combination of shape $\mathcal{S}$ and texture $\mathcal{T}$, which are given by:

$$\mathcal{S} = \mathcal{S}(\alpha, \beta) = \overline{\mathcal{S}} + B_{id}\alpha + B_{exp}\beta$$

$$\mathcal{T} = \mathcal{T}(\delta) = \overline{\mathcal{T}} + B_t\delta$$

where $\overline{\mathcal{S}}$ and $\overline{\mathcal{T}}$ denote average identity and texture, and the basis vectors of the identity, expression and texture space are represented with $B_{id}$, $B_{exp}$, $B_t$. The face identity, expression and texture are represented with the $\alpha \in \mathbb{R}^{80}$, $\beta \in \mathbb{R}^{64}$ and $\delta \in \mathbb{R}^{80}$, which are corresponding feature vectors to control the reconstructed face. Furthermore, the pose and position of 3D face are controlled by angle $\theta \in \mathbb{R}^3$ and translation $l \in \mathbb{R}^3$.

In some embodiments, the 3D face template can be offline stored on the encoder 1010 and decoder 1020 side instead of being transmitted in each communication connection. The reason behind this is that facial appearances could be assumed to be invariant within a certain period. Also, in some embodiments, it is not the first time for the receiver (i.e., decoder 1020) to render the specific 3D face of the same identity, such that it is feasible to store offline the face template model in the receiver (i.e., decoder 1020) side. It is noted that these 3D face templates can be generated by 3D face reconstruction algorithms or manual interactions. The input of the sender side (i.e., encoder 1010) is the talking face video $\{I_t|t=0,1,2\ldots N\}$ acquired with cameras, as well as the 3D face templates $M_{id}=\{\mathcal{S}_{id}, \mathcal{T}_{id}\}$. From the input talking face video, 3D facial parameter extraction module 1012 such as a 3DMM pretrained model (e.g., WM3DR model) extracts driving descriptors (also referred to as 3D facial parameters) that include expression, translation, angle, textures, and shapes. It is noted that 3D facial parameter extraction module 1012 could extract one or a combination of different information features. In some embodiments, 3DMM face models other than the WM3DR model can be used.

In this task, 3D facial parameters P generated by 3D facial parameter extraction module 1012 is transmitted, including expression $\beta \in \mathbb{R}^{64}$, translation $l \in \mathbb{R}^3$ and angle $\theta \in \mathbb{R}^3$. For expression parameter, different dimension can be chosen to transmit according to the bandwidth occupation. Certainly, when the expression dimension is reduced from $\mathbb{R}^{64}$ to $\mathbb{R}^{32}$ or lower (e.g., $\mathbb{R}^{16}$, $\mathbb{R}^8$, . . . ), the reconstructed quality of talking face video will be worse, but it is beneficial to reduce bit consumption.

In some embodiments, encoder 1010 can encode one or more parameters of the inter frame. To effectively encode the parameters of 3D compact features for inter frames, a predictive feature compression framework of compact facial parameter compression module 1013 is provided, where previously coded features are used to predict the current one, and only the residuals after prediction are coded. First, these 3D compact facial parameters $P \in \{\beta, l, \theta\}$ generated by 3D facial parameter extraction module 1012 are quantized and inter-predicted from the corresponding decoded features from the previous frame, to remove redundancy in feature representation. The process is given by:

$$\text{Res}_j = \hat{P}_j - \hat{P}_{j-1},$$

where $\hat{P}_{j-1}$ and $\hat{P}_j$ represent quantized compact feature map from the two adjacent $(j-1)_{th}$ and $j_{th}$ frames.

After quantization and inter-prediction, the residuals are entropy coded with zero-order exponential-Golomb coding by compact facial parameter compression module 1013. Subsequently, these binary codes with context-based arithmetic coding are compressed into the final bitstream. It should be mentioned that the context model of our lossless coding method is based on Prediction by Partial Matching (PPM), where a set of previous symbols in the uncompressed symbol stream are used to predict the next symbol. It is appreciated that such context model is an adaptive statistical data compression technique for skewed probability distribution, which can further actualize higher efficiency coding for compact facial parameter residuals. Finally, the coding bitstream compressed by context-based entropy algorithm is transmitted to the decoder 1020 side through the communication network.

In some embodiments, decoder 1020 can provide a motion estimation based on 3D face mesh.

At the receiver (i.e., decoder 1020) side, the bitstream is entropy decoded by compact facial parameter reconstruction module 1023 such that the reconstructed 3D facial parameters are obtained by compensating with the reconstructed 3D facial parameters of the previous frame. After obtaining these 3D compact facial parameters $P \in \beta$, 1, $\theta$, the 3D meshes (i.e., key-frame mesh and inter-frame mesh) are reconstructed by mesh reconstruction module 1024 based on 3DMM template. The relative process can refer to the process of compact facial parameter extraction based on 3DMM for the encoder 1010 side as described above.

Based on the reconstructed face meshes, a pixel-wise dense motion map and occlusion map learning scheme can be generated by sparse and dense motion estimation module 1026. First, a coarse motion field $M_{coarse}$ is obtained by transforming the reconstructed 3D face meshes of key frame and inter frame in the decoder 1020 (i.e., $Mesh_{key}$ and $Mesh_{inter}$, also referred to as key-frame mesh and inter-frame mesh). To be specific, the reconstructed 3D face meshes can be projected into 2D mesh points, mapped into the 2D image plane and executed in the difference operation to represent the motion trajectory. However, limited by the ability of 3DMM, this transformed sparse flow is not accurate enough. To be specific, this flow cannot represent the movement of other parts except the face, such as upper body and hair.

For solving this problem, after obtaining $M_{coarse}$, it is treated as the input together with the down-sampled key frame into a Convolutional Network such as U-Net architecture realized by sparse and dense motion estimation module 1026, which helps to generate a coarse deformed frame (i.e., $F_{cdf}$) for fine motion field expression. Concatenating coarse deformed frame $F_{cdf}$, original key frame $F_{key}$ and the coarse motion field $M_{coarse}$, a U-Net predictor is also adopted to estimate pixel-wise dense motion map (i.e., $M_{dense}$) and occlusion map (i.e., $M_{occlusion}$) Such operation can fully exploit implicit motion field characterization from the compact feature representation and benefit the inference of the final video.

$M_{dense} = P_1(f_{U-Net}(Concat(F_{cdf}, M_{coarse}, F_{key})))$, $M_{occlusion} = P_2(f_{U-Net}(Concat(F_{cdf}, M_{coarse}, F_{key})))$, where $P_1(\cdot)$ and $P_2(\cdot)$ indicate two different predicted outputs. Hence, sparse and dense motion estimation module 1026 can provide dense motion map ($M_{dense}$) and occlusion map ($M_{occlusion}$) to generation module 1027.

As mentioned above, different from the existing algorithms that the rendered face from 3DMM template is directly inputted into the deep generative network, the face generative compression algorithm provided by the present disclosure via dense motion estimation module 1026 provides a mechanism to exploit the motion between two 3D rendered facial meshes (e.g., key-frame mesh and inter-frame mesh) for a better 2D-plane face generation.

In some embodiments, decoder 1020 can provide generation module 1027. Deep neural networks, especially deep generative networks have strong inference capability to reconstruct realistic images. Generation module 1027 here may apply a deep generative network. In order to achieve the promising generative result, a feature warping strategy is used to warp the reconstructed key frame from key frame decoding (reconstruction) module 1021 according to $M_{dense}$. In the presence of occlusions in the reconstructed key frame, dense motion field $M_{dense}$ may not be sufficient to generate realistic result (i.e., $\hat{I}$) compared with I. As a result, occlusion map $M_{occlusion}$ from learned sparse feature difference is used to mask out the feature map regions that should be additionally repainted. The overall process is described as follows:

$\hat{I} = M_{occlusion} \odot f_w(K, M_{dense})$, where K means the reconstructed key frame by the key frame decoding (reconstruction) module 1021, and $f_w$ and $\odot$ denote the back-warping operation and the Hadamard product, respectively. Finally, the transformed result $\hat{I}$ is fed to subsequent network layers of the generation module to further render the key frame with the discriminator realized by generation module 1027.

In some embodiments, model supervision and loss functions can also be considered in framework 1000.

In the proposed framework 1000, perceptual loss, adversarial loss, id preserving loss and reconstruction texture are adopted to supervise the end-to-end training process. It should be noted that these related loss functions do not need to be used together and they can be combined according to the actual task needs.

Perceptual Loss: In order to reconstruct more realistic image, perceptual loss is used as reconstruction loss that combines the pre-trained VGG-19 network. It should be mentioned that perceptual loss is used twice for supervising coarse deformed frame $F_{cdf}$ if and transformed result $\hat{I}$ with the down-sampled original inter frame I, respectively. Let $VGG_i \in R^{C_i \times H_i \times W_i}$ be the feature map of the $i_{th}$ layer of VGG-19 model, the perceptual loss functions are given by:

$$L_{per-initial} = \sum_{n=1}^{i} \frac{1}{C_i \times H_i \times W_i} |VGG_i(F_{cdf}) - VGG_i(\phi(I))|,$$

$$L_{per-final} = \sum_{n=1}^{i} \frac{1}{C_i \times H_i \times W_i} |VGG_i(\hat{I}) - VGG_i(I)|.$$

Adversarial Loss: For further improving the realism of our generated images, a multi-scale discriminator including multiple discriminators (i.e., $D_i$) is operated on different image resolutions. The corresponding loss of the generator G and discriminator D are given by:

$$L_G(\hat{I}) = -\sum_{i=1}^{k} E_{\hat{I} \sim P_g}[D_i(\hat{I})],$$

$$L_D(\hat{I}, I) = \sum_{i=1}^{k} E_{\hat{I} \sim P_g}[D_i(\hat{I})] - \sum_{i=1}^{k} E_{I \sim P_r}[D_i(I)],$$

where $P_g$ and $P_r$ represent the generated and real image distribution.

Identity Preserving Loss: For identity discrimination and preservation, the pretrained face recognition model (i.e., ArcFace) is adopted to capture the most prominent facial features and enforce the reconstructed result to have a small distance in the deep feature space. The specific implementation is similar to perceptual loss.

$$L_{id}=|\text{ArcFace}_i(\hat{I})-\text{ArcFace}_i(I)|,$$

where $\text{ArcFace}_i$ represents the i-th layer feature.

Reconstruction Texture Loss: Detailed texture is an important consideration for face generation. For effectively capturing facial texture information, gram matrix is introduced to calculate the feature correlations of different layer from the pre-trained VGG-19 network.

$$L_{tex}=|\text{Gram}(VGG_i(\hat{I}))-\text{Gram }(VGG_i(I))|$$

To summarize, the overall end-to-end training loss is given by:

$$L_{total}=\lambda_{initial}L_{per\text{-}initial}+\lambda_{final}L_{per\text{-}final}+\lambda_{adv}(L_G+L_D)+\lambda_{id}L_{id}+\lambda_{tex}L_{tex},$$

where $\lambda_{initial}$ and $\lambda_{final}$ are both set to 10. $\lambda_{adv}$, $\lambda_{id}$ and $\lambda_{tex}$ are equal to 1, 40, and 100, respectively. Notedly, for these values of $\lambda$, they are set via empirical experiments. Other reasonable values also be considered to obtain a better training model.

In some embodiments, pose-controlled talking face video compression is further provided.

The proposed 3DMM-assisted framework 1000 can control head movement posture in the compressed code stream, which can further be applied into ultra-low bandwidth face video conference, human communication in the meta universe, virtual uploader for live commerce, and etc. Due to the pose and position of 3D face controlled by angle $\theta \in \mathbb{R}^3$ and translation $3 \in \mathbb{R}^3$, the value of angle and translation are changed, thus the pseudo driving face mesh can be retargeted. And finally, the pseudo driving face mesh together with key-frame mesh are inputted into the motion estimation module and frame generation to reconstruct face image with a novel pose and position, reflecting the adjusted parameters.

The benefits of the method for pose-controlled talking face video compression for different scenarios can be illustrates as below.

Ultra-low bandwidth face video conference: In the past three years, the world is experiencing an unprecedented and long-lasting COVID-19 epidemic, the demand in video conferencing/chat increases dramatically. The 3DMM-assisted generative compression network provided by the present disclosure has fully exploited the strong statistical regularities of face videos and just compressed 3D compact parameters to achieve face video reconstruction for end-users towards ultra-low bit-rate, thereby improving the efficiency of transmitting the talking face videos.

Human communication in the meta universe: Metaverse is a virtual world and a digital living space constructed by human using digital technology, which is mapped or surpassed by the real world, and can interact with the real world. Human character communication is very important for this new social system. The 3DMM-assisted generative compression network provided by the present disclosure can effectively achieve human parameter transfer and human character reconstruction. For example, the extracted pose information and facial parameters in the 3DMM template can be used to render the corresponding face meshes, and the relevant motion information can be learned from these meshes and directly transfer into the specific human character. Therefore, the communication bitrate keeps stable like the communication bitrate in face video conference.

Virtual character for live commerce: With the rise of domestic live broadcast demand, virtual commerce characters seem to be on the fast track of development and become a new trend of live broadcast delivery. Virtual character for live commerce can provide better freshness and attract more customers into the live room, while retaining the interactivity of a real person. With the rise of young generation, the world of the second dimension is also more attractive. The 3DMM-assisted generative compression network provided by the present disclosure can be applied in the virtual character for live commerce. The burden of network bandwidth with a number of customers can be reduced, when these customers are in the live room at the same time.

Figure 11:
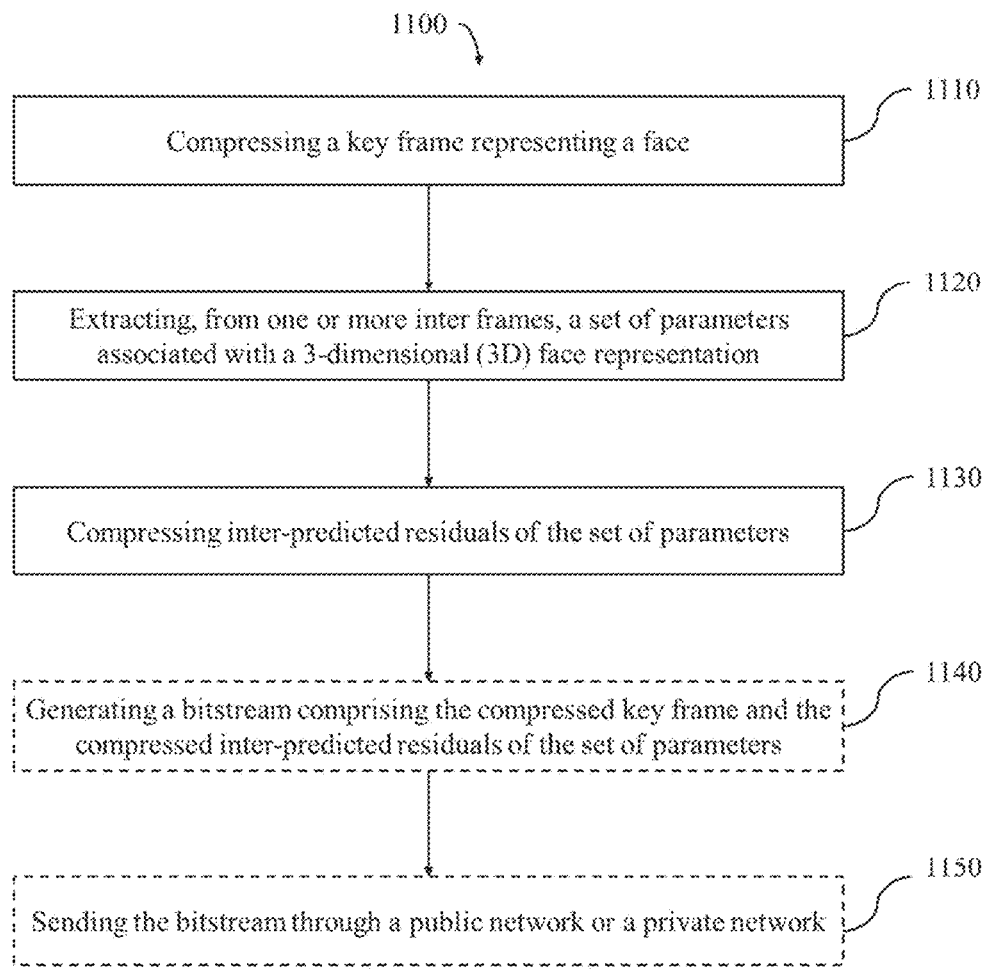
FIG. 11 is a schematic diagram illustrating an exemplary method for encoding video data, according to some embodiments of the present disclosure.

FIG. 11 is a schematic diagram illustrating an exemplary method 1100 for encoding video data, according to some embodiments of the present disclosure. For example, method 1100 may be performed by one or more processors associated with an encoder, such as image/video encoder 124 (FIG. 1), encoder 1010 (FIG. 10) etc. In some embodiments, image/video encoder 124 may be integrated into apparatus 400 shown in FIG. 4, such that method 1100 can be performed by apparatus 400. In some other examples, method 1100 may be performed by an encoder that is simulated by a general purpose processing unit and necessarily auxiliary components. In this situation, the encoder is implemented as an application or program for the users. As shown in FIG. 11, method 1100 includes the following steps 1110-1130. In addition, the optional steps 1140 and 1150 in the dashed boxes will be elaborated in detail below with other embodiments.

At step 1110, the encoder compresses a key frame representing a face.

Specifically, the encoder may compress the key frame according to Advanced Video Coding (AVC), High Efficiency Video Coding (HEVC), Versatile Video Coding (VVC) or other video standards. As a key frame, it may be not inter-frame encoded. For example, the key frame can be encoded as an I frame (Intra frame), which is independently coded from other frames. At the decoding side, a key frame can be decoded without referencing to other frames. In a non-restrictive example with VVC coding, the sequential key frames consisting of several key frames can be "intra-only" (or "all intra" simplified as "AI") encoded. In the present disclosure, the key frames include the texture information and can be used to reconstruct the face of an object. Hence, although may be not specifically elaborated in the embodiments, the key frame may be quantized and entropy encoded to achieve an acceptable quality under the actual environmental restrictions.

In some embodiments, the key frame and the one or more inter frames are generated in sequence by an image capturing device or an image capturing device array. In other words, the key frames and inter frames between the key frames are organized in a time manner. The sequential frames are captured by a filming device or a filming device array toward an object, e.g., a human face. When generated by a filming device array, the frames from different devices in the array may be merged to generate a merging frame as the key frames or the inter frames. The merging process here may be a joining process or other pixel fusion techniques between two frames from different devices for obtaining a fine picture of the target.

At step 1120, the encoder extracts a set of parameters associated with a 3-dimensional (3D) face representation from one or more inter frames, which reference the key frame in terms of coding. In some non-restrictive examples of the present disclosure, the inter frames other than the key frames can be represent by a series of parameters rather than the actual picture, so as to achieve ultra-low bit rate human video communication. In some examples, the set of parameters may comprise expression, translation, or angle of the face. In some other examples, the set of parameters may also comprise textures, shapes, and other parameters that can be used to represent a human face as a supplement. It should be noted that, in the present disclosure, any frames other than the key frames may exist as the inter frames. Thus, the visual information in most of the frames can be represented by compact parameters, as most of the frames are the inter frames.

In a non-restrictive example, the encoder may be used to construct a 3D Morphable Model (3DMM), and the set of parameters can be extracted by a 3DMM. In some examples, the 3DMM can be a weakly-supervised multi-face 3D reconstruction (WM3DR) model.

As described above, the 3DMM can provide accurate 3D face reconstruction based on the combination of shape $\mathcal{S}$ and texture $\mathcal{T}$, which are given by:

$$\mathcal{S} = \mathcal{S}(\alpha, \beta) = \overline{\mathcal{S}} + B_{id}\alpha + B_{exp}\beta$$

$$\mathcal{T} = \mathcal{T}(\delta) = \overline{\mathcal{T}} + B_t\delta$$

where $\overline{\mathcal{S}}$ and $\overline{\mathcal{T}}$ denote average identity and texture, and the basis vectors of the identity, expression and texture space are represented with $B_{id}$, $B_{exp}$, $B_t$. The face identity, expression and texture are represented with the $\alpha \in \mathbb{R}^{80}$, $\beta \in \mathbb{R}^{64}$ and $\delta \in \mathbb{R}^{80}$ which are corresponding feature vectors to control the reconstructed face. Furthermore, the pose and position of 3D face are controlled by angle $\theta \in \mathbb{R}^3$ and translation $l \in \mathbb{R}^3$.

As already described above, the 3D face template can be stored offline on the encoder and decoder side instead of being transmitted in each communication connection. It is noted that the 3DMM extractor could extract one or combined of different information features. In some embodiments, 3DMM face models other than the WM3DR model can be used.

Hence, the 3D facial parameters P can be transmitted for saving bits, which includes expression $\beta \in \mathbb{R}^{64}$, translation $l \in \mathbb{R}^3$ and angle $\theta \in \mathbb{R}^3$. For expression parameter, different dimension can be chosen to transmit according to the bandwidth occupation. Certainly, when the expression dimension is reduced from $R^{64}$ to $R^{32}$ or lower (e.g., $R^{16}$, $R^8$, . . . .), the reconstructed quality of talking face video will be worse, but it is beneficial to reduce bit consumption.

At step 1130, the encoder compresses the inter-predicted residuals of the set of parameters. Like the inter frames themselves, the generated parameters of corresponding inter frames may possess residuals too. Hence, the generated set of parameters can be represented with less bits to obtain a better coding efficiency.

Figure 12:
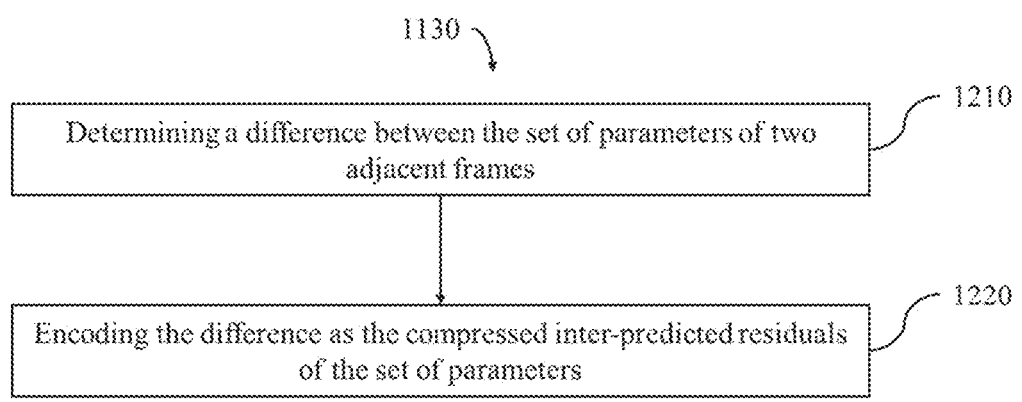
FIG. 12 is a schematic diagram illustrating an exemplary method for encoding video data, according to some embodiments of the present disclosure.

As shown in FIG. 12, the step 1130 of compressing the inter-predicted residuals of the set of parameters may be realized with the following steps 1210 and 1220.

At step 1210, the encoder determines a difference between the set of parameters of two adjacent frames.

As described above, the previously coded features can be used to predict the current one, and only the residuals after prediction are coded. First, the 3D compact facial parameters (i.e., the set of parameters associated with a 3D face representation) $P \in \{\beta, l, \theta\}$ can be quantized and inter-predicted from the corresponding decoded features from the previous frame, to remove redundancy in feature representation. The process is given by:

$$Res_j = \hat{P}_j - \hat{P}_{j-1},$$

where $\hat{P}_{j-1}$ and $\hat{P}_j$ represent quantized compact feature map from the two adjacent $(j-1)_{th}$ and $j_{th}$ frames.

At step 1220, the encoder encodes the difference as the compressed inter-predicted residuals of the set of parameters.

After quantization and inter-prediction, the residuals can be entropy coded with zero-order exponential-Golomb coding. Subsequently, these binary codes with context-based arithmetic coding are compressed into the final bitstream. It should be mentioned that the context model of our lossless coding method is based on Prediction by Partial Matching (PPM), where a set of previous symbols in the uncompressed symbol stream are used to predict the next symbol. It is appreciated that such context model is an adaptive statistical data compression technique for skewed probability distribution, which can further actualize high efficiency coding for compact facial parameter residuals. Finally, the coding bitstream compressed by context-based entropy algorithm is transmitted to the decoder side through the communication network.

It is appreciated that one key frame with subsequent inter frames may be used to encode a small episode of video, for example, four seconds. For a relative longer video, more than one key frame may be used. That is to say, method 1100 may be utilized to encode a video with several key frames and the corresponding inter frames.

Referring back to FIG. 11, method 1100 may further comprise step 1140 at which to generate a bitstream comprising the compressed key frame and the compressed inter-predicted residuals of the set of parameters. The encoder may generate a bitstream for transmitting or for storage. When processed by a decoder, the generated bitstream will be decoded as the key frame and the set of parameters, which can be used to reconstruct the face of the object.

Still referring to FIG. 11, method 1100 may further comprise step 1150 at which to send the bitstream through a public network or a private network. The output interface 126 (FIG. 1) may be used to send the bitstream via the communication medium 160 (FIG. 1) to the destination device 140 (FIG. 1).

It can be concluded here, with method 1100, any key frame representing the human textures can be compressed with the VVC encoder, for example. Through the pretrained WM3DR model, each of the subsequent inter frames is represented with 3DMM parameters (i.e., expression parameter and pose parameter). The size of compact 3D face parameter is not fixed, and the number of expression parameters can also be increased or decreased according to the specific requirement of bit consumption. In the following processes, these extracted features can be inter-predicted and quantized, and the residuals are finally entropy-coded as the final bitstream.

Figure 13:
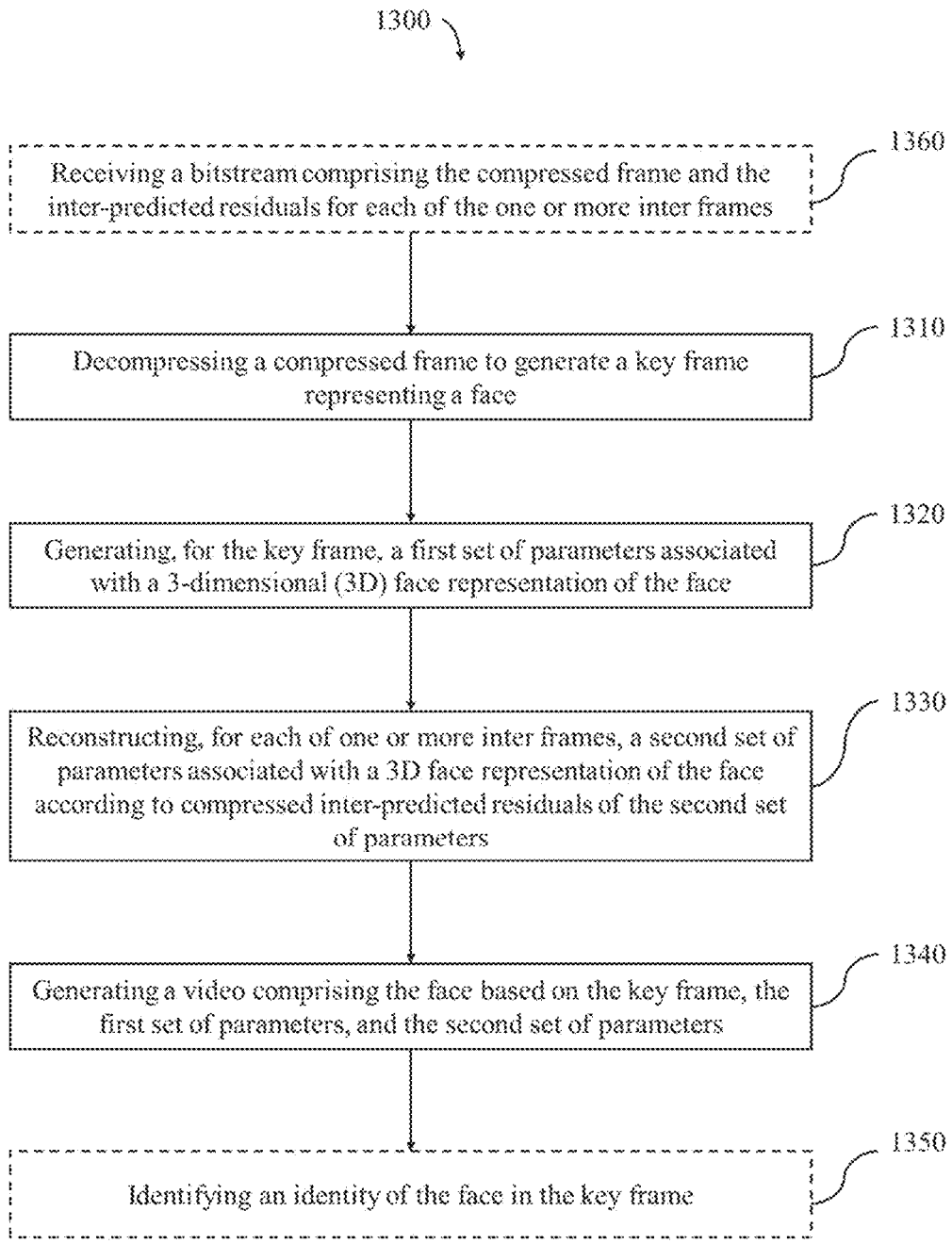
FIG. 13 is a schematic diagram illustrating an exemplary method for decoding video data, according to some embodiments of the present disclosure.

FIG. 13 is a schematic diagram illustrating an exemplary method for decoding video data, according to some embodiments of the present disclosure. For example, method 1300 may be performed by one or more processors, such as image/video decoder 144 (FIG. 1), decoder 1020 (FIG. 10). In some embodiments, image/video decoder 144 may be integrated into apparatus 400 shown in FIG. 4, such that method 1300 can be performed by apparatus 400. In some other examples, method 1300 may be performed by a decoder that is simulated by a general purpose processing unit and necessarily auxiliary components. In this situation, the decoder is implemented as an application or program for the users. As shown in FIG. 13, method 1300 includes the following steps 1310-1340. In addition, the optional steps 1350 and 1360 in the dashed boxes will be elaborated in detail below with other embodiments.

At step 1310, the decoder decompresses/decodes a compressed frame to generate a key frame representing a face. As stated above, the key frame may be intra encoded and not rely on other frames. The decompressed/decoded key frame contains rich texture information of a human face, which is essential to reconstruct a human face. However, the key frame may also contain expression, translation, or angle information of the face.

It is appreciated that the key frames themselves can be combined to generate rough video with relatively low frame rate. However, the key frames may be used to construct a video when the communicational environments are not ideal. Under these environments the parameters generated from the inter frames may be delayed or missed, so the key frames may be the sole candidates to construct the video as a supplementary scheme.

At step 1320, the decoder generates a first set of parameters associated with a 3-dimensional (3D) face representation of the face, for the key frame. It should be noted here, the set of parameters, the first set of parameters, and the second set of parameters may have the identical components (such as expression, translation, or angle). The antecedent "first" and "second" merely tent to distinguish the objects which generate the parameters. As shown in FIG. 10, the reconstructed key frame can be put into a pretrain WM3DR model for extracting driving descriptors which include expression, translation, angle, and other parameters. In some embodiments, different 3DMM face models can be selected except WM3DR model. The extraction procedure in the decoding side can be conducted similarly to the encoding side, wherein same descriptors can be extracted.

At step 1330, the decoder reconstructs a second set of parameters associated with a 3D face representation of the face according to compressed inter-predicted residuals of the second set of parameters, for each of one or more inter frames. Specifically, the compressed inter-predicted residuals of the second set of parameters may be entropy decoded such that the reconstructed 3D facial parameters (the second set of parameters) are obtained by compensating with the reconstructed 3D facial parameters of the previous frame.

At step 1340, the decoder generates a video comprising the face based on the key frame, the first set of parameters generated at step 1320, and the second set of parameters generated at step 1330. In other words, the face in the video can be generated according to the key frame, the first set of parameters, and the second set of parameters. In a further example, the talking face can also be used to combine with some other elements (e.g., background, clothes, props) to generate an avatar of the object. For example, the video can be used in ultra-low bandwidth face video conference, human communication in the meta universe, virtual character for live commerce and other possible scenarios.

Figure 14:
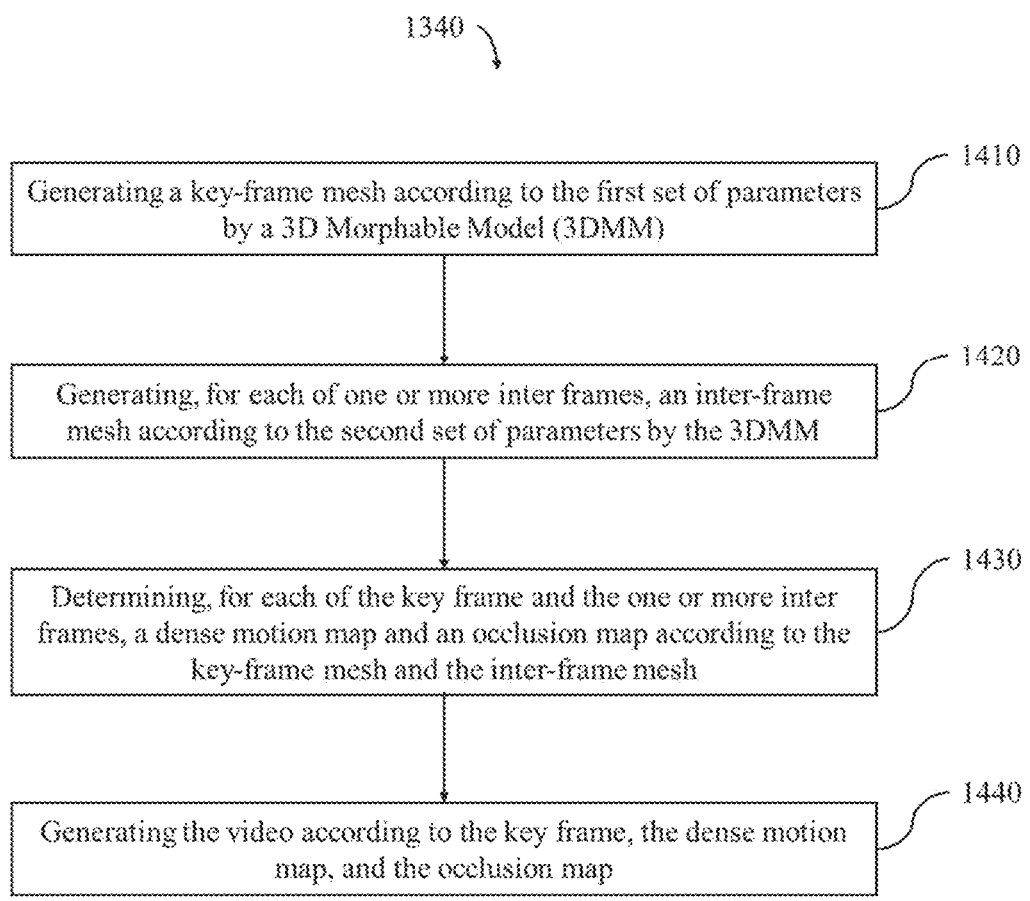
FIG. 14 is a schematic diagram illustrating an exemplary method for decoding video data, according to some embodiments of the present disclosure.

In some embodiments, as shown in FIG. 14, the step 1340 of generating a video comprising the face based on the key frame, the first set of parameters, and the second set of parameters may be realized with the following steps 1410-1440.

At step 1410, the decoder generates a key-frame mesh according to the first set of parameters by a 3D Morphable Model (3DMM), for example. At step 1420, the decoder generates an inter-frame mesh according to the second set of parameters by the 3DMM, for each of one or more inter frames. After obtaining the 3D compact facial parameters $P \in \beta, 1, \theta$, the 3D meshes (i.e., key-frame mesh and inter-frame mesh) are reconstructed based on 3DMM template. The relative process can refer to the process of compact facial parameter extraction based on 3DMM for the encoder side as described above, the present disclosure does not repeat here for abbreviation.

At step 1430, the decoder determines a dense motion map and an occlusion map according to the key-frame mesh and the inter-frame mesh, for each frame (i.e., the key frame and the inter frames). The dense motion map and the occlusion map would provide the optical flow for synthesis the human face, and the present disclosure does not limit here for how to generate the dense motion map and the occlusion map.

Figure 15:
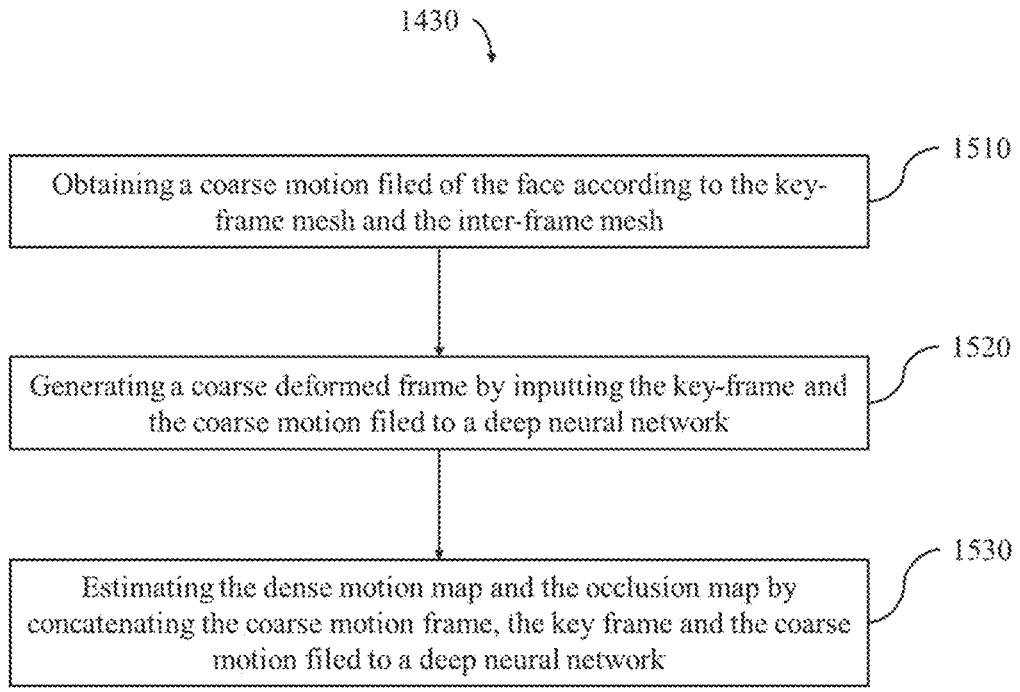
FIG. 15 is a schematic diagram illustrating an exemplary method for decoding video data, according to some embodiments of the present disclosure.

In some embodiments, as shown in FIG. 15, the step 1430 may be realized with the following steps: At step 1510, the decoder obtains a coarse motion filed of the face according to the key-frame mesh and the inter-frame mesh. At step 1520, the decoder generates a coarse deformed frame by inputting the key-frame and the coarse motion filed to a deep neural network. The deep neural network may be built within the decoder. At step 1530, the decoder estimates the dense motion map and the occlusion map by concatenating the coarse motion frame, the key frame and the coarse motion filed to the deep neural network.

As described above, a coarse motion field $M_{coarse}$ is obtained by transforming the reconstructed 3D face meshes of key frame and inter frame in the decoder (i.e., $Mesh_{key}$ and $Mesh_{inter}$, also referred to as key-frame mesh and inter-frame mesh). To be specific, the reconstructed 3D face meshes will be projected into 2D mesh points, mapped into the 2D image plane and executed the difference operation to represent the motion trajectory. However, the transformed sparse flow may be not accurate enough. To be specific, this flow cannot represent the movement of other parts except the face, such as upper body and hair.

For solving this problem, after obtaining $M_{coarse}$, it is treated as the input together with the down-sampled key frame into a U-Net architecture, which helps to generate a coarse deformed frame (i.e., $F_{cdf}$) for fine motion field expression. Concatenating coarse deformed frame $F_{cdf}$, original key frame $F_{key}$ and the coarse motion field $M_{coarse}$, a U-Net predictor is also adopted to estimate pixel-wise dense motion map (i.e., $M_{dense}$) and occlusion map (i.e., $M_{occlusion}$). Such operation can fully exploit implicit motion field characterization from the compact feature representation and benefit the inference of the final video.

$$M_{dense}=P_1(f_{U\text{-}Net}(\text{Concat}(F_{cdf}, M_{coarse}, F_{key}))),$$

$$M_{occlusion}=P_2(f_{U\text{-}Net}(\text{Concat}(F_{cdf}, M_{coarse}, F_{key}))),$$

where $P_1(\bullet)$ and $P_2(\bullet)$ indicate two different predicted outputs.

As mentioned above, different from the existing algorithms that the rendered face from 3DMM template is directly inputted into the deep generative network, the face generative compression algorithm provided by the present disclosure provides a mechanism to exploit the motion between two 3D rendered facial meshes (i.e., key-frame mesh and inter-frame mesh) for a better 2D-plane face generation.

Referring back to FIG. 14, at step 1440, the decoder generates the video according to the key frame, the dense motion map, and the occlusion map. As the dense motion map and the occlusion map can provide the optical flow of the picture, the video containing the human face can then be constructed taking consideration of the optical flow.

Figure 16:
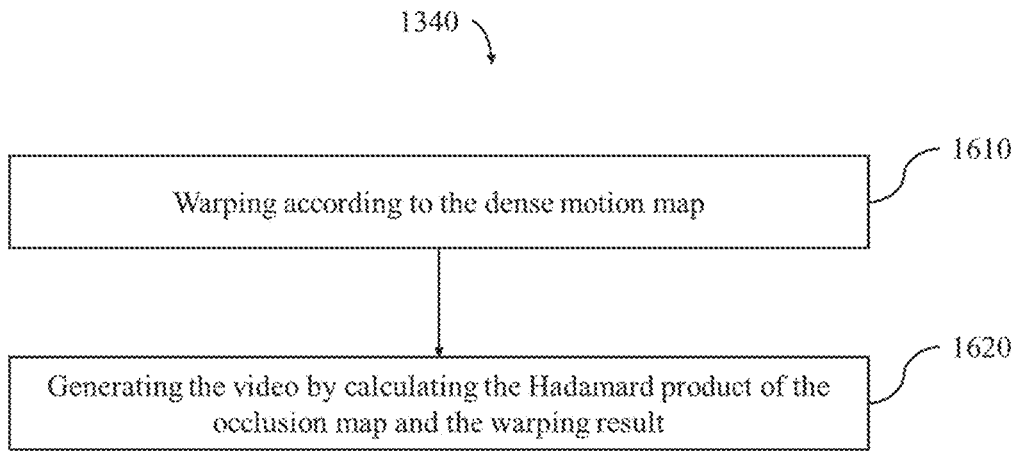
FIG. 16 is a schematic diagram illustrating an exemplary method for decoding video data, according to some embodiments of the present disclosure.

In some further embodiments, as shown in FIG. 16, the step 1340 may be further realized with following steps: At step 1610, the decoder warps the key frame according to the dense motion map. At step 1620, the decoder generates the video by calculating the Hadamard product of the occlusion map and the warping result.

As described above, deep neural networks, especially deep generative networks have strong inference capability to reconstruct realistic images. The decoder may apply a deep generative network. In order to achieve the promising generative result, a feature warping strategy is used to warp the reconstructed key frame according to $M_{dense}$. In the presence of occlusions in the reconstructed key frame, dense motion field $M_{dense}$ may not be sufficient to generate realistic result (i.e., Î) compared with I. As a result, occlusion map $M_{occlusion}$ from learned sparse feature difference is used to mask out the feature map regions that should be additionally repainted. The overall process is described as follows:

$$Î=M_{occlusion}\odot f_w(K, M_{dense}),$$

where K means the reconstructed key frame generated in step 1310, and $f_w$ and $\odot$ denote the back-warping operation and the Hadamard product, respectively. Finally, the transformed result Î is fed to subsequent network layers of the generation module to further render the key frame with discriminator.

Referring back to FIG. 13, method 1300 may further comprise step 1350 at which to identify an identity of the face in the key frame. The identity is an essential parameter of distinguishing between different people. In some examples, the WM3DR model and some other parts of the coding scheme rely on the identity to work. Hence, the decoder may identify the identity of the face and decide which model parameters to be used. In addition, the identity parameters can also be used to determine an identity preserving loss which will be described in detail below. Although shown as the last step in FIG. 13, a skilled person can understand, the identifying can be conducted after generating the key frame, and the present disclosure does not put limitation here.

Still referring to FIG. 13, method 1300 may further comprise step 1360 at which to receive a bitstream comprising the compressed frame and the inter-predicted residuals for each of the one or more inter frames.

In some examples, the generated video may comprise a corresponding reconstructed frame for each of one or more inter frame. According to some embodiments described above, method 1100 receives a bitstream comprising 3-dimensional (3D) parameters, reconstructs a 3D mesh according to the 3D parameters, learns an optical flow for synthesis according to the 3D mesh, and reconstructs the video (such as a video with talking human face) according to the optical flow. The video is reconstructed with motion estimation information and source appearance. The 3D mesh includes a source mesh (key-frame mesh) and a driving mesh (inter-frame mesh).

In some embodiments, model supervision and loss functions are introduced. For example, perceptual loss, adversarial loss, identity preserving loss and reconstruction texture loss can be adopted to supervise the end-to-end training process. It should be noted that these related loss functions do not need to be used together and they can be combined according to the actual task needs. The mathematic process of determining the perceptual loss, the adversarial loss, the identity preserving loss and reconstruction texture loss is suggested above, the present disclosure does not repeat here for abbreviation.

The deep neural network and generation module 1027 can be updated according to at least any of: a perceptual loss, an adversarial loss, an identity preserving loss, and a reconstruction texture loss between each of the one or more inter frames and its corresponding reconstructed frame.

In some embodiments, a non-transitory computer-readable storage medium storing a bitstream is also provided. The bitstream can be encoded and decoded according to the above-described encoder-decoder generative compression framework for talking face video (e.g., FIG. 10).

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, or a memory.

The embodiments may further be described using the following clauses:
1. A method for decoding video data, comprising:
   decompressing a compressed frame to generate a key frame representing a face;
   generating, for the key frame, a first set of parameters associated with a 3-dimensional (3D) face representation of the face;
   reconstructing, for each of one or more inter frames, a second set of parameters associated with a 3D face representation of the face according to compressed inter-predicted residuals of the second set of parameters; and
   generating a video comprising the face based on the key frame, the first set of parameters, and the second set of parameters.
2. The method according to clause 1, wherein the compressed frame is encoded according to any of following standards: Advanced Video Coding (AVC), High Efficiency Video Coding (HEVC), and Versatile Video Coding (VVC).
3. The method according to clause 1 or 2, wherein the first and second set of parameters comprise following items of the face: expression, translation, and angle.
4. The method according to clause 3, further comprising:
   identifying an identity of the face in the key frame, wherein the first set of parameters further comprise the identity of the face, and the second set of parameters comprise the identity of the face by inheriting from the first set of parameters.
5. The method according to any of clauses 1-4, generating the video comprising the face based on the key frame, the first set of parameters, and the second set of parameters comprises:
   generating a key-frame mesh according to the first set of parameters by a 3D Morphable Model (3DMM);
   generating, for each of one or more inter frames, an inter-frame mesh according to the second set of parameters by the 3DMM;

determining, for each of the key frame and the one or more inter frames, a dense motion map and an occlusion map according to the key-frame mesh and the inter-frame mesh; and generating the video according to the key frame, the dense motion map, and the occlusion map.

6. The method according to clause 5, wherein determining, for each of the key frame and the one or more inter frames, the dense motion map and the occlusion map according to the key-frame mesh and the inter-frame mesh comprises:

obtaining a coarse motion filed of the face according to the key-frame mesh and the inter-frame mesh;

generating a coarse deformed frame by inputting the key-frame and the coarse motion filed to a deep neural network; and estimating the dense motion map and the occlusion map by concatenating the coarse motion frame, the key frame and the coarse motion filed to the deep neural network.

7. The method according to clause 6, wherein generating the video comprising the face based on the key frame, the first set of parameters, and the second set of parameters comprises:

warping the key frame according to the dense motion map; and generating the video by calculating the Hadamard product of the occlusion map and the warping result.

8. The method according to clause 6, wherein the video is generated by a generation module, and the generated video comprises a corresponding reconstructed frame for each of one or more inter frames, and wherein the deep neural network or the generation module is updated with at least one of: a perceptual loss, an adversarial loss, an identity preserving loss, and a reconstruction texture loss between each of the one or more inter frames and its corresponding reconstructed frame.

9. The method according to any of clauses 5-8, wherein the 3DMM is a weakly-supervised multi-face 3D reconstruction (WM3DR) model.

10. The method according to any of clauses 1-9, further comprising:

receiving a bitstream comprising the compressed frame and the inter-predicted residuals for each of the one or more inter frames.

11. A method for encoding video data, comprising:
compressing a key frame representing a face;
extracting, from one or more inter frames, a set of parameters associated with a 3-dimensional (3D) face representation; and
compressing inter-predicted residuals of the set of parameters.

12. The method according to clause 11, wherein the key frame is compressed according to any of following standards: Advanced Video Coding (AVC), High Efficiency Video Coding (HEVC), and Versatile Video Coding (VVC).

13. The method according to clause 11 or 12, wherein the set of parameters comprises the following items of the face: expression, translation, or angle.

14. The method according to any of clauses 11-13, wherein compressing the inter-predicted residuals of the set of parameters comprises:
determining a difference between the set of parameters of two adjacent frames; and encoding the difference as the compressed inter-predicted residuals of the set of parameters.

15. The method according to any of clauses 11-14, wherein the set of parameters is extracted by a 3D Morphable Model (3DMM).

16. The method according to clause 15, wherein the 3DMM is a weakly-supervised multi-face 3D reconstruction (WM3DR) model.

17. The method according to any of clauses 11-16, further comprising:

generating a bitstream comprising the compressed key frame and the compressed inter-predicted residuals of the set of parameters.

18. The method according to clause 17, further comprising:

sending the bitstream through a public network or a private network.

19. The method according to any of clauses 11-18, wherein the key frame and the one or more inter frames are generated in sequence by an image capturing device or an image capturing device array.

20. A non-transitory computer readable storage medium storing a bitstream of a video, the bitstream comprising:

a compressed frame and inter-predicted residuals for each of one or more inter frames, wherein the compressed frame and compressed inter-predicted residuals, when decoded by a decoder, causes the decoder to perform a method comprising:

decompressing the compressed frame to generate a key frame representing a face;

generating, for the key frame, a first set of parameters associated with a 3-dimensional (3D) face representation of the face;

reconstructing, for each of one or more inter frames, a second set of parameters associated with a 3D face representation of the face according to the inter-predicted residuals; and generating a video of the face based on the key frame, the first set of parameters, and the second set of parameters.

21. The medium according to clause 20, wherein the compressed frame is encoded according to any of following standards: Advanced Video Coding (AVC), High Efficiency Video Coding (HEVC), and Versatile Video Coding (VVC).

22. The medium according to clause 20 or 21, wherein the first and second set of parameters comprise following items of the face: expression, translation, and angle.

23. The medium according to clause 22, wherein the method further comprises:

identifying an identity of the face in the key frame, wherein the first set of parameters further comprise the identity of the face, and the second set of parameters comprise the identity of the face by inheriting from the first set of parameters.

24. The medium according to any of clauses 20-23, generating the video comprising the face based on the key frame, the first set of parameters, and the second set of parameters comprises:

generating a key-frame mesh according to the first set of parameters by a 3D Morphable Model (3DMM);

generating, for each of one or more inter frames, an inter-frame mesh according to the second set of parameters by the 3DMM;

determining, for each of the key frame and the one or more inter frames, a dense motion map and an occlusion map according to the key-frame mesh and the inter-frame mesh; and
generating the video according to the key frame, the dense motion map, and the occlusion map.
25. The medium according to clause 24, wherein determining, for each of the key frame and the one or more inter frames, the dense motion map and the occlusion map according to the key-frame mesh and the inter-frame mesh comprises:
obtaining a coarse motion filed of the face according to the key-frame mesh and the inter-frame mesh;
generating a coarse deformed frame by inputting the key-frame and the coarse motion filed to a deep neural network; and
estimating the dense motion map and the occlusion map by concatenating the coarse motion frame, the key frame and the coarse motion filed to the deep neural network.
26. The medium according to clause 25, wherein generating the video comprising the face based on the key frame, the first set of parameters, and the second set of parameters comprises:
warping the key frame according to the dense motion map; and
generating the video by calculating the Hadamard product of the occlusion map and the warping result.
27. The medium according to clause 25, wherein the video is generated by a generation module, and the generated video comprises a corresponding reconstructed frame for each of one or more inter frames, and
the deep neural network or the generation module is updated with at least one of: a perceptual loss, an adversarial loss, an identity preserving loss, and a reconstruction texture loss between each of the one or more inter frames and its corresponding reconstructed frame.
28. The medium according to any of clauses 24-27, wherein the 3DMM is a weakly-supervised multi-face 3D reconstruction (WM3DR) model.
29. The medium according to any of clauses 20-29, wherein the method further comprises:
receiving a bitstream comprising the compressed frame and the inter-predicted residuals for each of the one or more inter frames.
30. An apparatus for decoding video data, comprising:
a decoder configured to decompressing a compressed frame to generate a key frame representing a face;
an extractor configured to generate, for the key frame, a first set of parameters associated with a 3-dimensional (3D) face representation of the face; and to reconstruct, for each of one or more inter frames, a second set of parameters associated with a 3D face representation of the face according to compressed inter-predicted residuals of the second set of parameters; and
a generator configured to generate a video comprising the face based on the key frame, the first set of parameters, and the second set of parameters.
31. The apparatus according to clause 30, wherein the compressed frame is encoded according to any of following standards: Advanced Video Coding (AVC), High Efficiency Video Coding (HEVC), and Versatile Video Coding (VVC).
32. The apparatus according to clause 30 or 31, wherein the first and second set of parameters comprise following items of the face: expression, translation, and angle.
33. The apparatus according to clause 32, wherein the extractor is further configured to identify an identity of the face in the key frame, wherein the first set of parameters further comprise the identity of the face, and the second set of parameters comprise the identity of the face by inheriting from the first set of parameters.
34. The apparatus according to any of clauses 30-33, wherein the generator comprises a generation module, and the generator is further configured to:
generate a key-frame mesh according to the first set of parameters by a 3D Morphable Model (3DMM);
generate, for each of one or more inter frames, an inter-frame mesh according to the second set of parameters by the 3DMM;
determine, for each of the key frame and the one or more inter frames, a dense motion map and an occlusion map according to the key-frame mesh and the inter-frame mesh; and
generate, by the generation module, the video according to the key frame, the dense motion map, and the occlusion map.
35. The apparatus according to clause 34, wherein the generator is further configured to:
obtain a coarse motion filed of the face according to the key-frame mesh and the inter-frame mesh;
generate a coarse deformed frame by inputting the key-frame and the coarse motion filed to a deep neural network; and
estimate the dense motion map and the occlusion map by concatenating the coarse motion frame, the key frame and the coarse motion filed to the deep neural network.
36. The apparatus according to clause 35, wherein the generator is further configured to:
warp the key frame according to the dense motion map; and
generate the video by calculating the Hadamard product of the occlusion map and the warping result.
37. The apparatus according to clause 35, wherein the generated video comprises a corresponding reconstructed frame for each of one or more inter frames, and
the deep neural network or the generator is updated with at least one of: a perceptual loss, an adversarial loss, an identity preserving loss, and a reconstruction texture loss between each of the one or more inter frames and its corresponding reconstructed frame.
38. The apparatus according to any of clauses 34-37, wherein the 3DMM is a weakly-supervised multi-face 3D reconstruction (WM3DR) model.
39. The apparatus according to any of clauses 30-38, further comprising:
a receiver configured to receive a bitstream comprising the compressed frame and the inter-predicted residuals for each of the one or more inter frames.
40. An apparatus for encoding video data, comprising:
an encoder configured to compress a key frame representing a face;
an extractor configured to extract, from one or more inter frames, a set of parameters associated with a 3-dimensional (3D) face representation; and
a coding module configured to compress inter-predicted residuals of the set of parameters.
41. The apparatus according to clause 40, wherein the key frame is compressed according to any of following standards: Advanced Video Coding (AVC), High Efficiency Video Coding (HEVC), and Versatile Video Coding (VVC).

42. The apparatus according to clause 40 or 41, wherein the set of parameters comprises the following items of the face: expression, translation, or angle.

43. The apparatus according to any of clauses 40-42, wherein the coding module is further configured to:
   determining a difference between the set of parameters of two adjacent frames; and
   encoding the difference as the compressed inter-predicted residuals of the set of parameters.

44. The apparatus according to any of clauses 40-43, wherein the set of parameters is extracted by a 3D Morphable Model (3DMM).

45. The apparatus according to clause 44, wherein the 3DMM is a weakly-supervised multi-face 3D reconstruction (WM3DR) model.

46. The apparatus according to any of clauses 40-45, wherein the encoder is further configured to generate a bitstream comprising the compressed key frame and the compressed inter-predicted residuals of the set of parameters.

47. The apparatus according to clause 46, wherein the encoder is further configured to send the bitstream through a public network or a private network.

48. The apparatus according to any of clauses 40-47, wherein the key frame and the one or more inter frames are generated in sequence by an image capturing device or an image capturing device array.

49. An apparatus for decoding video data, comprising:
   a memory configured to store instructions; and
   one or more processors configured to execute the instructions to cause the apparatus to perform:
     decompressing a compressed frame to generate a key frame representing a face;
     generating, for the key frame, a first set of parameters associated with a 3-dimensional (3D) face representation of the face;
     reconstructing, for each of one or more inter frames, a second set of parameters associated with a 3D face representation of the face according to compressed inter-predicted residuals of the second set of parameters; and
     generating a video comprising the face based on the key frame, the first set of parameters, and the second set of parameters.

50. The apparatus according to clause 49, wherein the compressed frame is encoded according to any of following standards: Advanced Video Coding (AVC), High Efficiency Video Coding (HEVC), and Versatile Video Coding (VVC).

51. The apparatus according to clause 49 or 50, wherein the first and second set of parameters comprise following items of the face: expression, translation, and angle.

52. The apparatus according to clause 51, wherein the apparatus is further caused to perform:
   identifying an identity of the face in the key frame, wherein the first set of parameters further comprise the identity of the face, and the second set of parameters comprise the identity of the face by inheriting from the first set of parameters.

53. The apparatus according to any of clauses 49-52, generating the video comprising the face based on the key frame, the first set of parameters, and the second set of parameters comprises:
   generating a key-frame mesh according to the first set of parameters by a 3D Morphable Model (3DMM);
   generating, for each of one or more inter frames, an inter-frame mesh according to the second set of parameters by the 3DMM;
   determining, for each of the key frame and the one or more inter frames, a dense motion map and an occlusion map according to the key-frame mesh and the inter-frame mesh; and
   generating the video according to the key frame, the dense motion map, and the occlusion map.

54. The apparatus according to clause 53, wherein determining, for each of the key frame and the one or more inter frames, the dense motion map and the occlusion map according to the key-frame mesh and the inter-frame mesh comprises:
   obtaining a coarse motion filed of the face according to the key-frame mesh and the inter-frame mesh;
   generating a coarse deformed frame by inputting the key-frame and the coarse motion filed to a deep neural network; and
   estimating the dense motion map and the occlusion map by concatenating the coarse motion frame, the key frame and the coarse motion filed to the deep neural network.

55. The apparatus according to clause 54, wherein generating the video comprising the face based on the key frame, the first set of parameters, and the second set of parameters comprises:
   warping the key frame according to the dense motion map; and
   generating the video by calculating the Hadamard product of the occlusion map and the warping result.

56. The apparatus according to clause 54, wherein the video is generated by a generation module, and the generated video comprises a corresponding reconstructed frame for each of one or more inter frames, and the deep neural network or the generation module is updated with at least one of: a perceptual loss, an adversarial loss, an identity preserving loss, and a reconstruction texture loss between each of the one or more inter frames and its corresponding reconstructed frame.

57. The apparatus according to any of clauses 53-56, wherein the 3DMM is a weakly-supervised multi-face 3D reconstruction (WM3DR) model.

58. The apparatus according to any of clauses 49-57, wherein the apparatus is further caused to perform:
   receiving a bitstream comprising the compressed frame and the inter-predicted residuals for each of the one or more inter frames.

59. An apparatus for encoding video data, comprising:
   a memory configured to store instructions; and
   one or more processors configured to execute the instructions to cause the apparatus to perform:
     compressing a key frame representing a face;
     extracting, from one or more inter frames, a set of parameters associated with a 3-dimensional (3D) face representation; and
     compressing inter-predicted residuals of the set of parameters.

60. The apparatus according to clause 59, wherein the key frame is compressed according to any of following standards: Advanced Video Coding (AVC), High Efficiency Video Coding (HEVC), and Versatile Video Coding (VVC).

61. The apparatus according to clause 59 or 60, wherein the set of parameters comprises the following items of the face: expression, translation, or angle.

62. The apparatus according to any of clauses 59-61, wherein compressing the inter-predicted residuals of the set of parameters comprises:
    determining a difference between the set of parameters of two adjacent frames; and
    encoding the difference as the compressed inter-predicted residuals of the set of parameters.
63. The apparatus according to any of clauses 59-62, wherein the set of parameters is extracted by a 3D Morphable Model (3DMM).
64. The apparatus according to clause 63, wherein the 3DMM is a weakly-supervised multi-face 3D reconstruction (WM3DR) model.
65. The apparatus according to any of clauses 59-64, wherein the apparatus is further caused to perform:
    generating a bitstream comprising the compressed key frame and the compressed inter-predicted residuals of the set of parameters.
66. The apparatus according to clause 65, wherein the apparatus is further caused to perform:
    sending the bitstream through a public network or a private network.
67. The apparatus according to any of clauses 59-66, wherein the key frame and the one or more inter frames are generated in sequence by an image capturing device or an image capturing device array.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:
1. A method for decoding a bitstream, comprising:
   receiving a bitstream; and
   decoding the bitstream to generate a video, the decoding comprising:
      decompressing a compressed frame to generate a key frame representing a face;
      generating, for the key frame, a first set of parameters associated with a 3-dimensional (3D) face representation of the face;
      reconstructing, for each of one or more inter frames, a second set of parameters associated with a 3D face representation of the face according to a set of compressed parameters, the set of compressed parameter being generated by compressing inter-predicted residuals of the second set of parameters; and
   generating the video comprising the face based on the key frame, the first set of parameters, and the second set of parameters;
   wherein generating the video comprising the face based on the key frame, the first set of parameters, and the second set of parameters comprises:
      generating a key-frame mesh according to the first set of parameters by a 3D Morphable Model (3DMM);
      generating, for each of one or more inter frames, an inter-frame mesh according to the second set of parameters by the 3DMM;
      determining, for each of the key frame and the one or more inter frames, a dense motion map and an occlusion map according to the key-frame mesh and the inter-frame mesh; and
      generating the video according to the key frame, the dense motion map, and the occlusion map.
2. The method according to claim 1, wherein the compressed frame is encoded according to any of following standards: Advanced Video Coding (AVC), High Efficiency Video Coding (HEVC), and Versatile Video Coding (VVC).
3. The method according to claim 1, wherein the first and second set of parameters comprise at least one of expression, translation, or angle.
4. The method according to claim 3, further comprising:
   identifying an identity of the face in the key frame, wherein the first set of parameters further comprise the identity of the face, and the second set of parameters comprise the identity of the face by inheriting from the first set of parameters.
5. The method according to claim 1, wherein determining, for each of the key frame and the one or more inter frames, the dense motion map and the occlusion map according to the key-frame mesh and the inter-frame mesh comprises:
   obtaining a coarse motion filed of the face according to the key-frame mesh and the inter-frame mesh;

generating a coarse deformed frame by inputting the key-frame and the coarse motion filed to a deep neural network; and
estimating the dense motion map and the occlusion map by concatenating the coarse motion frame, the key frame, and the coarse motion filed to the deep neural network.

6. The method according to claim 5, wherein generating the video comprising the face based on the key frame, the first set of parameters, and the second set of parameters comprises:
warping the key frame according to the dense motion map; and
generating the video by calculating a Hadamard product of the occlusion map and the warping result.

7. The method according to claim 5, wherein the video is generated by a generation module, and the generated video comprises a corresponding reconstructed frame for each of one or more inter frames, and
the deep neural network or the generation module is updated with at least one of: a perceptual loss, an adversarial loss, an identity preserving loss, and a reconstruction texture loss between each of the one or more inter frames and its corresponding reconstructed frame.

8. The method according to claim 1, wherein the 3DMM is a weakly-supervised multi-face 3D reconstruction (WM3DR) model.

9. The method according to claim 1, further comprising:
receiving a bitstream comprising the compressed frame and the inter-predicted residuals for each of the one or more inter frames.

10. The method according to claim 1, wherein the video is generated based on dense motion maps and occlusion maps corresponding to the key-frame and the one or more inter frames.

11. An apparatus for information processing, comprising:
a memory configured to store instructions; and
one or more processors configured to execute the instructions to cause the apparatus to perform operations comprising:
receiving a bitstream; and
decoding the bitstream to generate a video, the decoding comprising:
decompressing a compressed frame to generate a key frame representing a face;
generating, for the key frame, a first set of parameters associated with a 3-dimensional (3D) face representation of the face;
reconstructing, for each of one or more inter frames, a second set of parameters associated with a 3D face representation of the face according to a set of compressed parameters, the set of compressed parameter being generated by compressing inter-predicted residuals of the second set of parameters; and
generating the video comprising the face based on the key frame, the first set of parameters, and the second set of parameters;
wherein generating the video comprising the face based on the key frame, the first set of parameters, and the second set of parameters comprises:
generating a key-frame mesh according to the first set of parameters by a 3D Morphable Model (3DMM);
generating, for each of one or more inter frames, an inter-frame mesh according to the second set of parameters by the 3DMM;
determining, for each of the key frame and the one or more inter frames, a dense motion map and an occlusion map according to the key-frame mesh and the inter-frame mesh; and
generating the video according to the key frame, the dense motion map, and the occlusion map.

12. The apparatus according to claim 11, wherein the compressed frame is encoded according to any of following standards: Advanced Video Coding (AVC), High Efficiency Video Coding (HEVC), and Versatile Video Coding (VVC).

13. The apparatus according to claim 11, wherein the first and second set of parameters comprise at least one of expression, translation, or angle.

14. The apparatus according to claim 13, wherein the operations further comprise:
identifying an identity of the face in the key frame, wherein the first set of parameters further comprise the identity of the face, and the second set of parameters comprise the identity of the face by inheriting from the first set of parameters.

15. The apparatus according to claim 11, wherein determining, for each of the key frame and the one or more inter frames, the dense motion map and the occlusion map according to the key-frame mesh and the inter-frame mesh comprises:
obtaining a coarse motion filed of the face according to the key-frame mesh and the inter-frame mesh;
generating a coarse deformed frame by inputting the key-frame and the coarse motion filed to a deep neural network; and
estimating the dense motion map and the occlusion map by concatenating the coarse motion frame, the key frame, and the coarse motion filed to the deep neural network.

16. The apparatus according to claim 15, wherein generating the video comprising the face based on the key frame, the first set of parameters, and the second set of parameters comprises:
warping the key frame according to the dense motion map; and
generating the video by calculating a Hadamard product of the occlusion map and the warping result.

17. The apparatus according to claim 15, wherein the video is generated by a generation module, and the generated video comprises a corresponding reconstructed frame for each of one or more inter frames, and
the deep neural network or the generation module is updated with at least one of: a perceptual loss, an adversarial loss, an identity preserving loss, and a reconstruction texture loss between each of the one or more inter frames and its corresponding reconstructed frame.

18. The apparatus according to claim 11, wherein the 3DMM is a weakly-supervised multi-face 3D reconstruction (WM3DR) model.

19. The apparatus according to claim 11, wherein the operations further comprise:
receiving a bitstream comprising the compressed frame and the inter-predicted residuals for each of the one or more inter frames.

20. A non-transitory computer readable medium that stores a set of instructions that is executable by one or more processors of an apparatus to cause the apparatus to perform operations comprising:
receiving a bitstream; and
decoding the bitstream to generate a video, the decoding comprising:

decompressing a compressed frame to generate a key frame representing a face;

generating, for the key frame, a first set of parameters associated with a 3-dimensional (3D) face representation of the face;

reconstructing, for each of one or more inter frames, a second set of parameters associated with a 3D face representation of the face according to a set of compressed parameters, the set of compressed parameter being generated by compressing inter-predicted residuals of the second set of parameters; and generating the video comprising the face based on the key frame, the first set of parameters, and the second set of parameters;

wherein generating the video comprising the face based on the key frame, the first set of parameters, and the second set of parameters comprises:

generating a key-frame mesh according to the first set of parameters by a 3D Morphable Model (3DMM);

generating, for each of one or more inter frames, an inter-frame mesh according to the second set of parameters by the 3DMM;

determining, for each of the key frame and the one or more inter frames, a dense motion map and an occlusion map according to the key-frame mesh and the inter-frame mesh; and generating the video according to the key frame, the dense motion map, and the occlusion map.

* * * * *